US012782646B2

(12) United States Patent
Etheridge et al.

(10) Patent No.: US 12,782,646 B2
(45) Date of Patent: Nov. 3, 2026

(54) MULTI-FIBER PUSH ON (MPO) CONNECTOR THAT IS CONFIGURED TO BE FIELD ASSEMBLED AFTER BEING PUSHED THROUGH A DUCT

(71) Applicant: PPC BROADBAND, INC., East Syracuse, NY (US)

(72) Inventors: Harvey Etheridge, Norfolk (GB); Shaun Trezise, Aldeburgh (GB)

(73) Assignee: PPC BROADBAND, INC., East Syracuse, NY (US)

( * ) Notice: Subject to any disclaimer, the term of this patent is extended or adjusted under 35 U.S.C. 154(b) by 266 days.

(21) Appl. No.: 18/129,000

(22) Filed: Mar. 30, 2023

(65) Prior Publication Data

US 2023/0314727 A1 Oct. 5, 2023

Related U.S. Application Data

(60) Provisional application No. 63/325,572, filed on Mar. 30, 2022.

(51) Int. Cl.
*G02B 6/38* (2006.01)

(52) U.S. Cl.
CPC ......... *G02B 6/3885* (2013.01); *G02B 6/3833* (2013.01); *G02B 6/387* (2013.01); *G02B 6/3893* (2013.01)

(58) Field of Classification Search
CPC ......... G02B 6/3807; G02B 6/38; G02B 6/387
See application file for complete search history.

(56) References Cited

U.S. PATENT DOCUMENTS 5,600,747 A * 2/1997 Yamakawa .......... G02B 6/3879 385/71
6,396,993 B1 * 5/2002 Giebel ................. G02B 6/3807 385/139

(Continued)

FOREIGN PATENT DOCUMENTS

CN 116224500 A 6/2023
CN 118131408 A 6/2024

(Continued)

OTHER PUBLICATIONS

International Search Report and Written Opinion dated Jul. 10, 2023 in corresponding International Application No. PCT/US2023/016992, 22 pages.

(Continued)

*Primary Examiner* — Eric Wong
(74) *Attorney, Agent, or Firm* — MH2 TECHNOLOGY LAW GROUP LLP

(57) ABSTRACT

A multi-fiber push on (MPO) connector configured to be field assembled after being pushed through a duct may include a ferrule portion configured to terminate fibers of a multi-fiber cable and a sub-assembly portion. The sub-assembly portion may be configured to include an adapter portion that may be configured to be coupled with the ferrule portion, a retaining portion that may be configured to be coupled with the multi-fiber cable, and a biasing portion that may be configured to extend on one or more sides of the fibers of the multi-fiber cable and to couple the adapter portion with the retaining portion. The biasing portion may be configured to apply one or more biasing forces to the adapter portion on one or more sides of the fibers to urge the ferrule portion in a forward direction such that the one or more biasing forces are balanced on such one or more sides of the fibers.

30 Claims, 19 Drawing Sheets

(56) References Cited

U.S. PATENT DOCUMENTS

| | | | | |
|---|---|---|---|---|
| 9,297,976 | B2 | 3/2016 | Hill et al. | |
| 9,383,539 | B2 | 7/2016 | Hill et al. | |
| 10,139,573 | B2 | 11/2018 | Isenhour et al. | |
| 10,401,572 | B2 | 9/2019 | Isenhour et al. | |
| 10,921,528 | B2 | 2/2021 | Wong et al. | |
| 10,921,530 | B2 | 2/2021 | Wong et al. | |
| 11,092,760 | B2 | 8/2021 | Wong et al. | |
| 11,131,814 | B2 | 9/2021 | Iizumi et al. | |
| 11,480,741 | B2 | 10/2022 | Ho et al. | |
| 11,543,601 | B1 | 1/2023 | Xiao et al. | |
| 12,085,765 | B2 | 9/2024 | Leeson et al. | |
| 2017/0160486 | A1 | 6/2017 | Krawczyk et al. | |
| 2018/0314013 | A1* | 11/2018 | Kaplan ................ | G02B 6/3897 |
| 2018/0364424 | A1 | 12/2018 | Ott et al. | |
| 2019/0377138 | A1* | 12/2019 | Wong ................... | G02B 6/3885 |
| 2020/0049898 | A1* | 2/2020 | Hosokawa ........... | G02B 6/3821 |
| 2022/0137306 | A1* | 5/2022 | Conrad ................ | G02B 6/3831 385/78 |
| 2022/0326449 | A1* | 10/2022 | Shinoda ............... | G02B 6/3821 |
| 2023/0314727 | A1 | 10/2023 | Etheridge et al. | |

FOREIGN PATENT DOCUMENTS

| | | | |
|---|---|---|---|
| CN | 118169815 | A | 6/2024 |
| WO | 2021065195 | A1 | 4/2021 |
| WO | 2023074563 | A1 | 5/2023 |
| WO | 2024077696 | A1 | 4/2024 |

OTHER PUBLICATIONS

Indian First Examination Report dated Jul. 14, 2026 in corresponding Indian Application No. 202417074802, 9 pages.

* cited by examiner

MULTI-FIBER PUSH ON (MPO) CONNECTOR THAT IS CONFIGURED TO BE FIELD ASSEMBLED AFTER BEING PUSHED THROUGH A DUCT

CROSS-REFERENCE TO RELATED APPLICATIONS

This application claims the benefit of U.S. Provisional Application No. 63/325,572 filed Mar. 30, 2022, the disclosure of which is hereby incorporated by reference herein in its entirety.

TECHNICAL FIELD

The present disclosure relates to fiber optic connectors and, more particularly, to a ferrule assembly for a pushable multi-fiber push on connector.

BACKGROUND

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, optical connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" connectors).

Many different types of optical connectors exist. In environments that require high density interconnects and/or high bandwidth, such as data centers, multi-fiber optical connectors are the most widely used. One example is the multi-fiber push on (MPO) connector, which incorporates a mechanical transfer (MT) ferrule standardized according to TOA-604-5 and IEC 61754-7. Another example is the MTP® connector, which is a particular type of MPO connector (MTP® is a trademark of US Conec Ltd.). These connectors can achieve a very high density of optical fibers, which reduces the amount of hardware, space, and effort to establish a large number of interconnects.

However, conventional MPO connectors are too large to be pushed through ducts used in fiber optic cable distributions, for example, ducts having an inside diameter of less than 10 mm and, in some aspects, ducts having an inside diameter of 5.5 mm Therefore, it may be desirable to provide an MPO connector having a ferrule portion that can terminate a multi-fiber cable and be pushed through a duct and having a sub-assembly that can be coupled with the ferrule portion in the field to assemble the MPO connector after the terminated multi-fiber cable is pushed through the duct.

It may be desirable to provide an MPO connector with a biasing portion (e.g., one or more biasing members) that may be configured to apply a biasing force to the ferrule, such as by applying one or more balanced biasing forces on opposite sides of the fibers, so as to urge the ferrule in a forward direction.

SUMMARY

According to various aspects of the disclosure, a multi-fiber push on (MPO) connector that may be configured to be field assembled after being pushed through a duct may include a ferrule portion configured to terminate fibers of a multi-fiber cable and a sub-assembly portion. The sub-assembly may include a ferrule portion configured to terminate fibers of a multi-fiber cable and a sub-assembly portion that includes an adapter portion that may be configured to be coupled with the ferrule portion, a retaining portion that may be configured to be coupled with the multi-fiber cable, and a biasing member that may be configured to extend a longitudinally engage the adapter portion and the retaining portion. The biasing member may comprise a first biasing member configured to extend on a first side of the fibers of the multifiber cable and a second biasing member configured to extend on a second side of the fibers of the multifiber cable, and the first side of the fiber of the multifiber cable may be located opposite to the second side of the fiber of the multifiber cable. The adapter portion and the ferrule portion may be configured to cooperate to define an MPO connector ferrule, and the ferrule portion may be configured with a cross-sectional profile that is smaller than a cross-sectional profile of the MPO connector such that the ferrule portion is configured to be pushed through a duct having an inside diameter that is smaller than a cross-sectional profile of the MPO connector ferrule. The ferrule portion may be configured to include a receiving ferrule portion that is located at a lateral side of the ferrule portion, the receiving ferrule portion may comprise a plurality of receiving ferrule portions that are each located on different lateral sides of the ferrule portion, and the receiving ferrule portion may comprise a first receiving ferrule portion that is located on a first lateral side of the ferrule portion and a second receiving ferrule portion that is located on a second lateral side of the ferrule portion that is located opposite to the first lateral side of the ferrule portion. The adapter portion may be configured to include a receiving adapter portion that is configured to oppose the receiving ferrule portion of the ferrule portion, and the receiving ferrule portion and the receiving adapter portion are configured to cooperate to define a receiving structure that may be configured to receive an alignment portion. The biasing member may be configured to be coupled with the alignment portions and with a receiving ferrule portion in a forward end portion of the retaining portion so as to couple the adapter portion with the retaining portion, and the biasing member may be configured to apply a biasing force to the adapter portion so to urge the ferrule portion in a forward direction. The first biasing member may be configured to apply a first biasing force adjacent to a first side of the fiber and the second biasing member may be configured to apply a second biasing force adjacent to a second side of the fiber, the second side of the fiber is located on an opposite side of the fibers relative to the first side of the fiber, and the first biasing force and the second biasing force are configured to provide a balanced biasing force on opposite sides of the fibers. The adapter portion, the retaining portion, and the biasing member may be configured to be coupled together to assemble the sub-assembly portion such that the assembled sub-assembly portion can be coupled with the ferrule portion, and the assembled sub-assembly portion may be configured to be coupled with the ferrule portion after the ferrule portion is pushed through a duct so as to simplify field assembly of the MPO connector.

In some embodiments, the biasing member may comprise a compression spring.

In one or more of the above embodiments, the retaining portion may comprise two body portions that are configured to be connected to one another by a hinge portion.

In one or more of the above embodiments, the hinge portion may comprise a living hinge.

In one or more of the above embodiments, the retaining portion may comprise a single monolithic structure of unitary construction.

In one or more of the above embodiments, the connector further may comprise a housing portion configured to be coupled with the retaining member and a shell portion configured to be coupled with the housing. In some aspects, the shell portion may be configured to house a biasing portion configured to bear against a forward facing surface of the housing portion and a rearward facing surface of the shell portion to urge the shell portion in the forward direction. In some aspects, the connector may be configured to be disconnected from a mating adapter by urging the shell portion in a rearward direction against a force of the biasing portion, thereby transferring an urging force to the housing rather than the cable.

In one or more of the above embodiments, the receiving structures may be configured to receive alignment members from a mating MPO connector.

According to various aspects of the disclosure, a multi-fiber push on (MPO) connector that may be configured to be field assembled after being pushed through a duct may include a ferrule portion configured to terminate fibers of a multi-fiber cable and a sub-assembly portion including an adapter portion that may be configured to be coupled with the ferrule portion, a retaining portion that may be configured to be coupled with the multi-fiber cable, and a biasing portion that may be configured to extend on opposite sides of the fibers of the multi-fiber cable and to couple the adapter portion with the retaining portion. The adapter portion and the ferrule portion may be configured to cooperate to define an MPO connector ferrule, and the ferrule portion may be configured to be pushed through a duct having an inside diameter smaller than a cross-sectional profile of the MPO connector ferrule. The biasing portion may be configured to be coupled with the adapter portion and the retaining portion to couple the adapter portion with the retaining portion, and the biasing portion may be configured to apply separate biasing forces to the adapter portion on opposite sides of the fibers so as to urge the ferrule portion in a forward direction such that the biasing forces are balanced on opposite sides of the fibers. The adapter portion, the retaining portion, and the biasing portion may be configured to be coupled together to assemble the sub-assembly portion such that the assembled sub-assembly portion can be coupled with the ferrule portion, and the assembled sub-assembly portion may be configured to be coupled with the ferrule portion after the ferrule portion is pushed through a duct so as to simplify field assembly of the MPO connector.

In one or more of the above embodiments, the biasing portion may comprise two biasing members disposed parallel to one another on opposite sides of the fibers.

In one or more of the above embodiments, each of the biasing members may comprise a compression spring.

In one or more of the above embodiments, the retaining portion may comprise two body portions that are configured to be connected to one another by a hinge portion.

In one or more of the above embodiments, the hinge portion may comprise a living hinge.

In one or more of the above embodiments, retaining portion may comprise a single monolithic structure of unitary construction.

In one or more of the above embodiments, the connector further may comprise a housing portion configured to be coupled with the retaining member, and a shell portion configured to be coupled with the housing. In some aspects, the shell portion may be configured to house a second biasing portion configured to bear against a forward facing surface of the housing portion and a rearward facing surface of the shell portion to urge the shell portion in the forward direction. In some aspects, the connector may be configured to be disconnected from a mating adapter by urging the shell portion in a rearward direction against a force of the biasing portion, thereby transferring an urging force to the housing rather than the cable.

In one or more of the above embodiments, the ferrule portion may be configured to include first receiving portions at opposing laterals sides of the ferrule portion, the adapter portion may be configured to include second receiving portions that oppose the first receiving portions of the ferrule portion, and the first receiving portions and the second receiving portions may be configured to cooperate to define receiving structures configured to receive an alignment portion.

In one or more of the above embodiments, the receiving structures may be configured to receive alignment members from a mating MPO connector.

According to various aspects of the disclosure, a multi-fiber push on (MPO) connector that may be configured to be field assembled after being pushed through a duct may include a ferrule portion configured to terminate fibers of a multi-fiber cable and a sub-assembly portion including an adapter portion that may be configured to be coupled with the ferrule portion, a retaining portion that may be configured to be coupled with the multi-fiber cable, and a biasing portion that may be configured to extend on opposite sides of the fibers of the multi-fiber cable and to couple the adapter portion with the retaining portion. The biasing portion may be configured to apply separate biasing forces to the adapter portion on opposite sides of the fibers so as to urge the ferrule portion in a forward direction such that the biasing forces are balanced on opposite sides of the fibers.

In one or more of the above embodiments, the adapter portion, the retaining portion, and the biasing portion may be configured to be coupled together to assemble the sub-assembly portion such that the assembled sub-assembly portion can be coupled with the ferrule portion, and the assembled sub-assembly portion may be configured to be coupled with the ferrule portion after the ferrule portion is pushed through a duct so as to simplify field assembly of the MPO connector.

In one or more of the above embodiments, the adapter portion and the ferrule portion may be configured to cooperate to define an MPO connector ferrule, and the ferrule portion may be configured to be pushed through a duct having an inside diameter smaller than a cross-sectional profile of the MPO connector ferrule.

In one or more of the above embodiments, the biasing portion may be configured to be coupled with the adapter portion and the retaining portion to couple the adapter portion with the retaining portion.

In one or more of the above embodiments, the biasing portion may comprise two biasing members disposed parallel to one another on opposite sides of the fibers.

In one or more of the above embodiments, each of the biasing members may comprise a compression spring.

In one or more of the above embodiments, the retaining portion may comprise two body portions that are configured to be connected to one another by a hinge portion.

In one or more of the above embodiments, the hinge portion may comprise a living hinge.

In one or more of the above embodiments, retaining portion may comprise a single monolithic structure of unitary construction.

In one or more of the above embodiments, the connector further may comprise a housing portion configured to be coupled with the retaining member and a shell portion configured to be coupled with the housing. The shell portion may be configured to house a second biasing portion configured to bear against a forward facing surface of the housing portion and a rearward facing surface of the shell portion to urge the shell portion in the forward direction. The connector may be configured to be disconnected from a mating adapter by urging the shell portion in a rearward direction against a force of the biasing portion, thereby transferring an urging force to the housing rather than the cable.

In one or more of the above embodiments, the ferrule portion may be configured to include first receiving portions at opposing laterals sides of the ferrule portion, the adapter portion may be configured to include second receiving portions that oppose the first receiving portions of the ferrule portion, and wherein the first receiving portions and the second receiving portions may be configured to cooperate to define receiving structures configured to receive an alignment portion.

In one or more of the above embodiments, the receiving structures may be configured to receive alignment members from a mating MPO connector.

The foregoing and other features of construction and operation of the invention will be more readily understood and fully appreciated from the following detailed disclosure, taken in conjunction with accompanying drawings.

DETAILED DESCRIPTION OF EMBODIMENTS

As a preface to the detailed description, it should be noted that, as used in this specification and the appended claims, the singular forms "a," "an," and "the" include singular and/or plural referents, unless the context clearly dictates otherwise.

Figure 1:
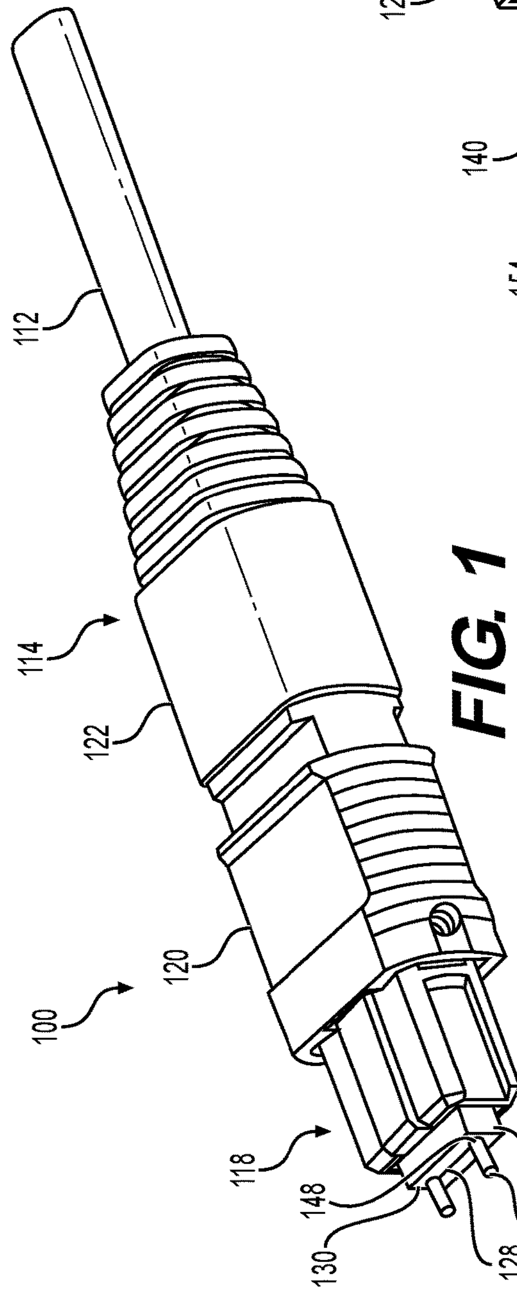
FIG. 1 (PRIOR ART)
FIG. 1 is a perspective view of a conventional a fiber optic connector.
Figure 2:
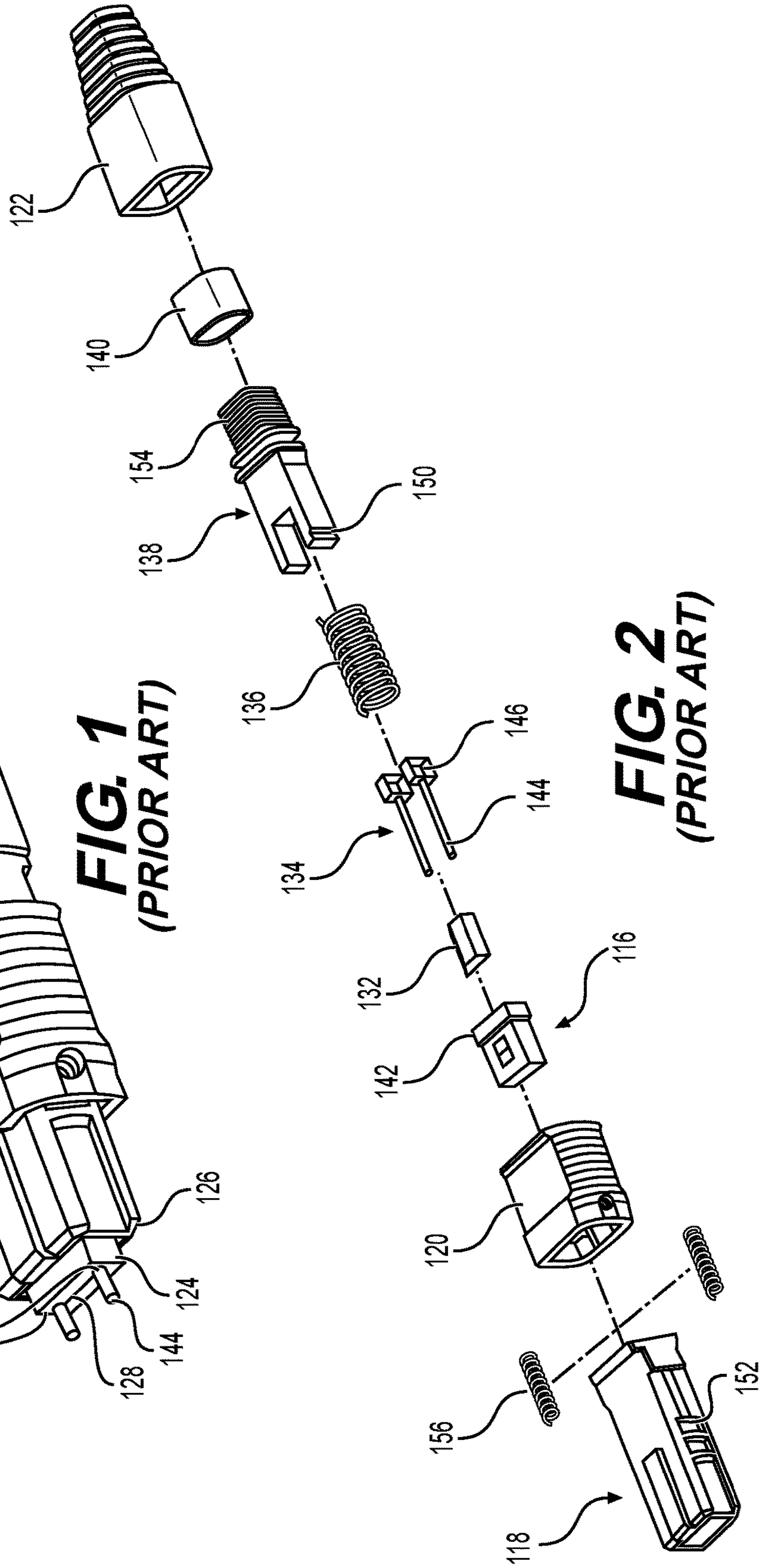
FIG. 2 (PRIOR ART)
FIG. 2 is an exploded perspective view of the conventional fiber optic connector of FIG. 1.

FIGS. 1 and 2 illustrate a conventional fiber optic connector 100 (also referred to as an "optical connector" or simply "connector") in the form of an MTP® connector, which is a particular type of MPO connector (MTP® is a trademark of US Conec Ltd.).

As shown in FIG. 1, the connector 100 may be installed on a fiber optic cable 112 ("cable") to form a fiber optic cable assembly 114. The connector includes a ferrule 116, a housing 118 received over the ferrule 116, a slider 120 received over the housing 118, and a boot 122 received over the cable 112. The ferrule 116 is biased within the housing 118 so that a front portion 124 of the ferrule 116 extends beyond a front end 126 of the housing 118. Optical fibers (not shown) carried by the cable 112 extend through bores/micro-holes 128 in the ferrule 116 before terminating at or near an end face 130 of the ferrule 116. The optical fibers are secured within the ferrule 116 using an adhesive material (e.g., epoxy) and can be presented for optical coupling with optical fibers of a mating optical component (e.g., another fiber optic connector; not shown) when the housing 120 is inserted into an adapter, receptacle, or the like.

As shown in FIG. 2, the connector 100 also includes a ferrule boot 132, a guide pin assembly 134, a biasing member 136, a retaining member 138 (also referred to as a crimp body), and a crimp ring 140. The ferrule boot 132 is received in a rear portion 142 of the ferrule 116 to help support the optical fibers extending to the ferrule bores 128 (FIG. 1). The guide pin assembly 134 includes a pair of guide pins 144 extending from a pin keeper 146. Features on the pin keeper 146 cooperate with features on the guide pins 144 to retain portions of the guide pins 144 within the pin keeper 146. When the connector 100 is assembled, the pin keeper 146 is positioned against a back surface of the ferrule 116, and the guide pins 144 extend through pin holes 148 (FIG. 1) provided in the ferrule 116 so as to project beyond the front end face 130 of the ferrule 116.

Both the ferrule 116 and the guide pin assembly 134 are biased to a forward position relative to the housing 118 by the spring 136. More specifically, the spring 136 is positioned between the pin keeper 146 and a portion of the crimp body 138. The crimp body 138 is inserted into the housing 118 when the connector 100 is assembled and includes latching arms 150 that engage recesses or openings 152 in the housing 118. When the connector 100 is assembled, the spring 136 is compressed and exerts a biasing force on the ferrule 116 via the pin keeper 146 to urge the front portion 124 of the ferrule 116 beyond the front end 126 of the housing 118. The rear portion 142 of the ferrule 116 defines a flange that interacts with a shoulder or stop formed within the housing 118 to retain the rear portion 142 within the housing 118, i.e., to prevent the ferrule 116 from being pushed out of the front end 126 of the housing 118.

In a manner not shown in the figures, aramid yarn or other strength members from the cable 112 may be positioned over an end portion 154 of the crimp body 138 that projects rearwardly from the housing 118. The aramid yarn may be secured to the end portion 154 by the crimp ring 140, which is slid over the end portion 154 and deformed after positioning the aramid yarn. The boot 122 covers this region, as shown in FIG. 1, and provides strain relief for the optical fibers by limiting the extent to which the connector 100 can bend relative to the cable 112. To insert the connector 100 into an adapter or receptacle, the connector 100 is configured such that a user grasps the boot 122 and pushes the connector 100 into the adapter or receptacle, thereby allowing the housing to be fully inserted for proper engagement/mating with the adapter or receptacle. To disengage the connector 100 from an adapter or receptacle, the user grasps and pulls the slider 120, which may be biased by springs 156 (FIG. 2) relative to the housing 118, away from the adapter or receptacle. As a result, pull forces are transferred directly to the housing 118 (rather than the cable 112) to disengage the housing 118 from the adapter or receptacle.

Figure 3:
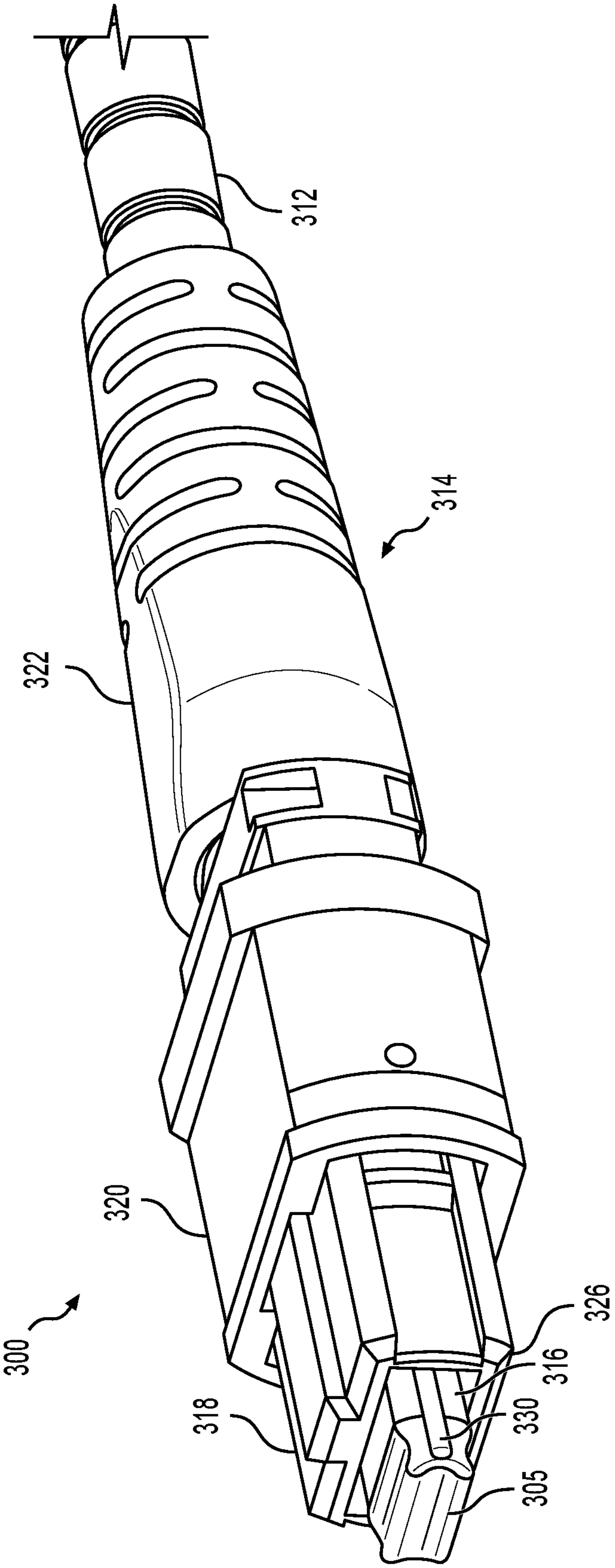
FIG. 3 is a perspective view of an exemplary fiber optic connector in accordance with various aspects of the disclosure.
Figure 4:
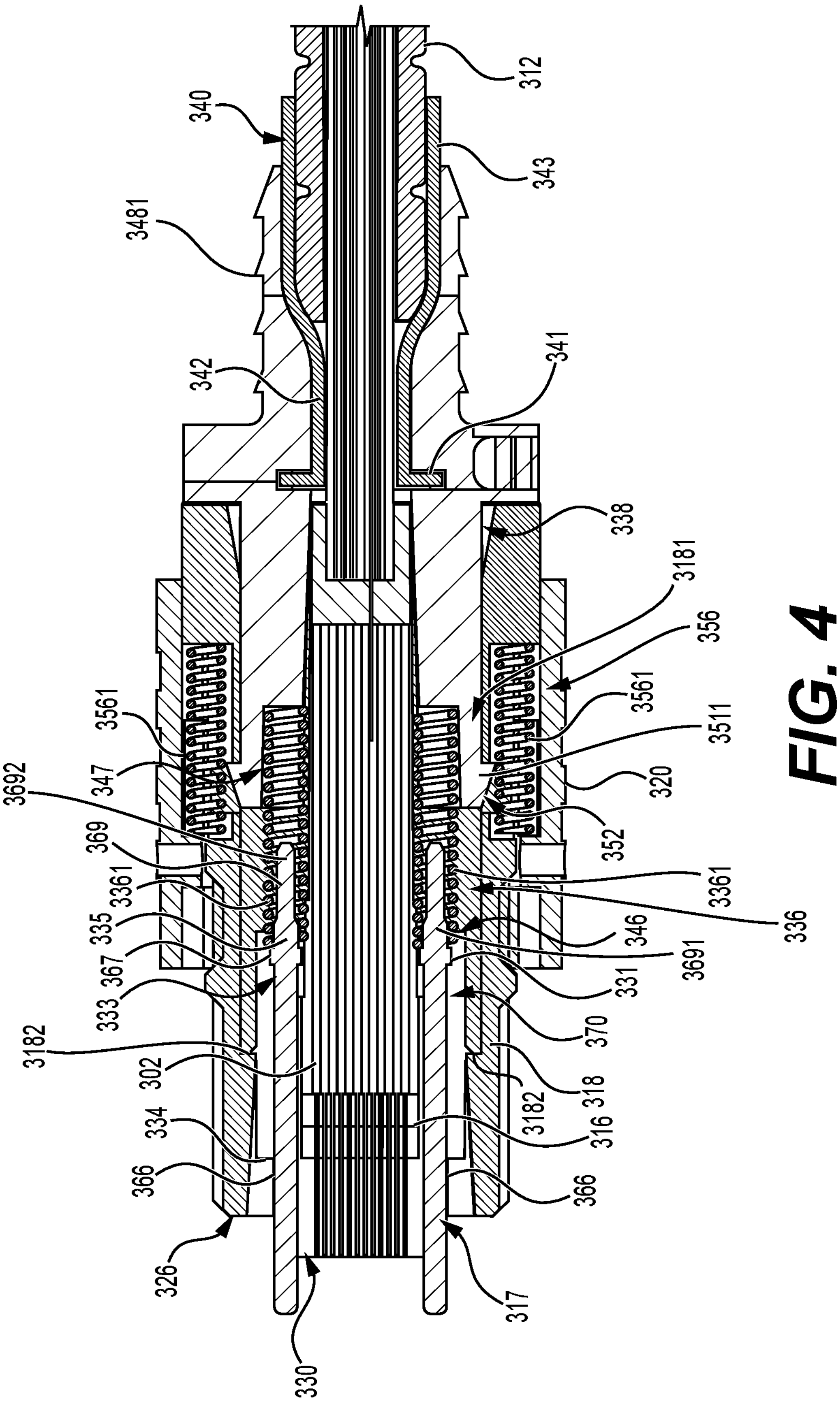
FIG. 4 is top cross-sectional view of the fiber optic connector of FIG. 3.
Figure 5:
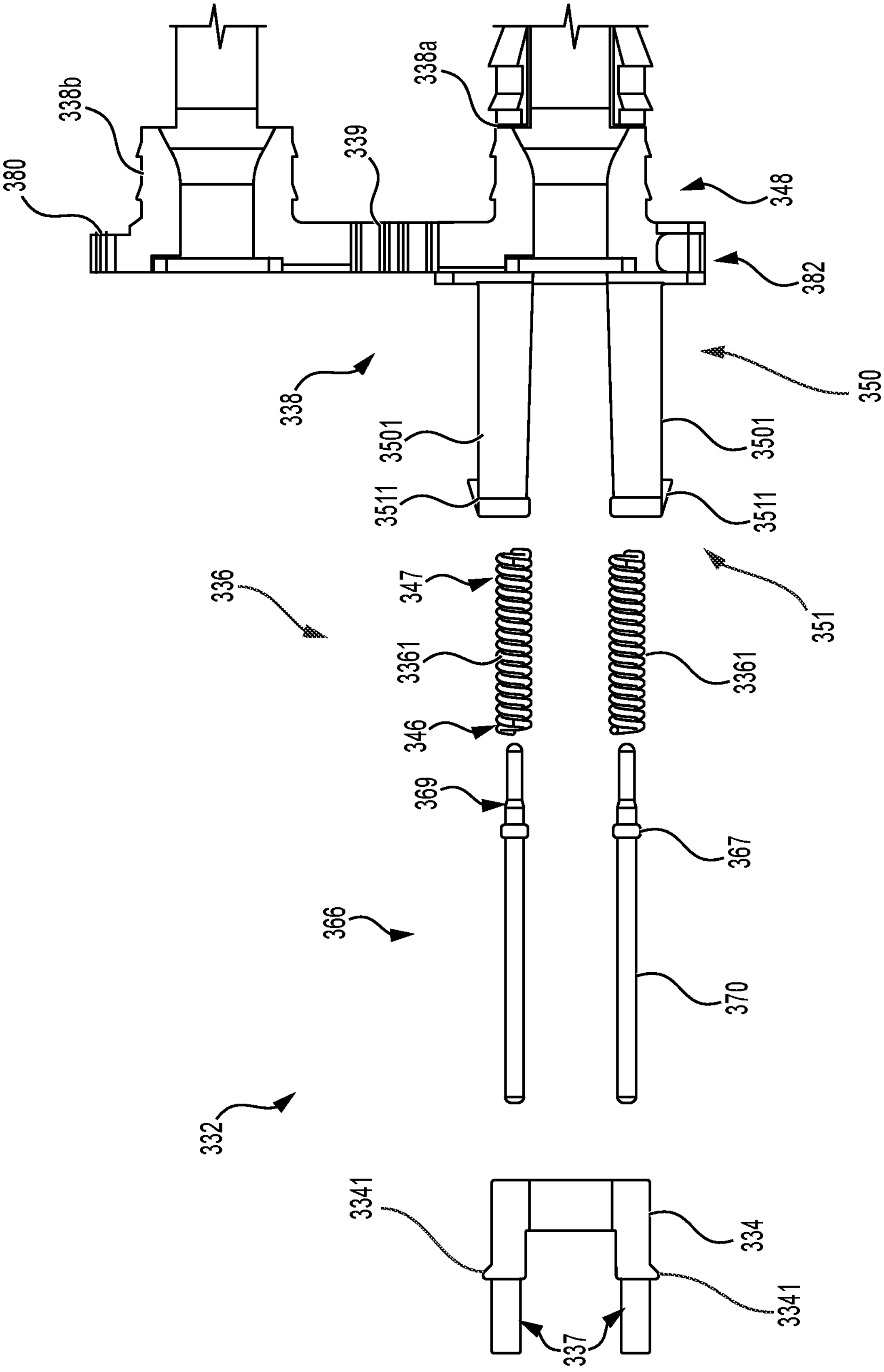
FIG. 5 is an exploded top view of an adapter sub-assembly of the fiber optic connector of FIG. 3.
Figure 6:
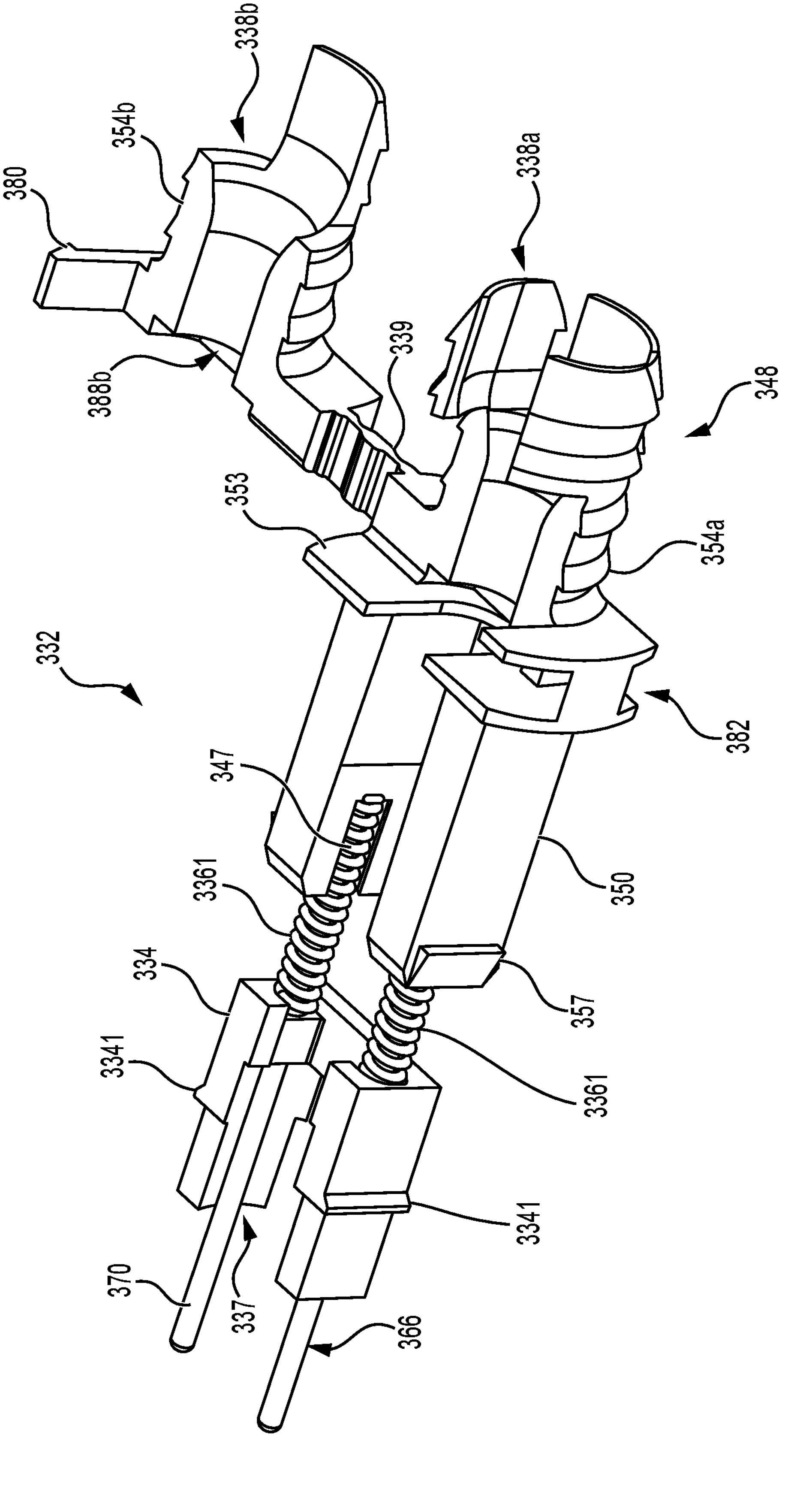
FIG. 6 is a perspective view of the adapter sub-assembly of FIG. 5.
Figure 7:
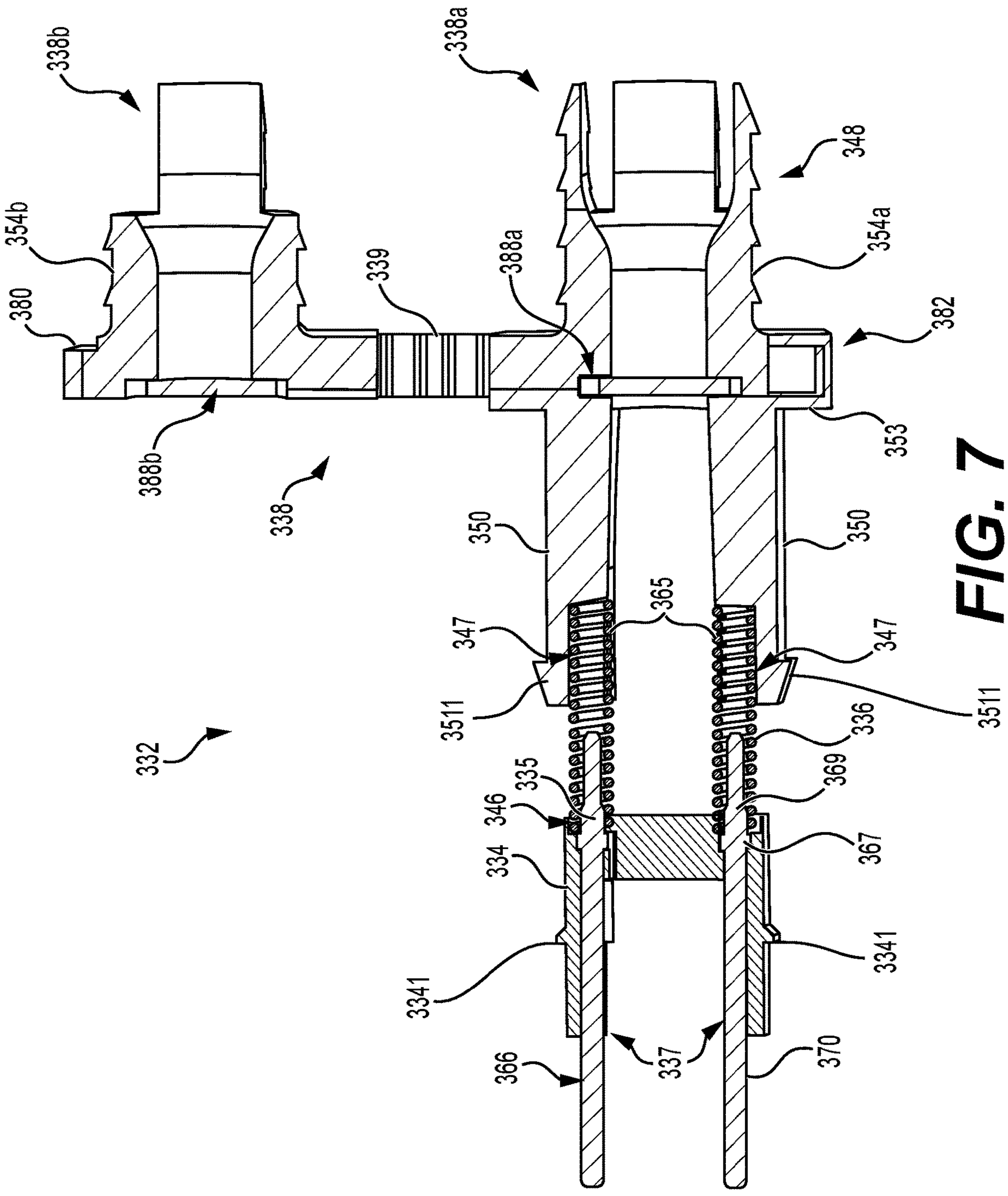
FIG. 7 is a top view of the adapter sub-assembly of FIG. 5.

Referring now to FIGS. 3-21, an exemplary fiber optic connector 300 in accordance with various aspects of the disclosure is illustrated and described. The fiber optic connector 300 is in the form of an MPO connector. As shown in FIGS. 3 and 4, the connector 300 may be installed on a fiber optic cable 312 ("cable") to form a fiber optic cable assembly 314. The connector 300 includes a ferrule or ferrule portion 316 (e.g., a mechanical transfer (MT) ferrule), a housing or housing portion 318 configured to be received over the ferrule 316, a shell or shell portion 320 configured to be received over the housing 318, and a boot or boot portion 322 configured to be received over the cable 312. The ferrule 316 is configured to be spring-biased within the housing 318 toward a front end portion 326 of the housing 318. Optical fibers 302 carried by the cable 312 extend through a receiving portion 328 in the ferrule 316 before terminating at or near an end face portion 330 of the ferrule 316. The receiving portion 328 may comprise bores/micro-holes, for example. The optical fibers 302 may be secured within the ferrule 316 using an adhesive material (e.g., epoxy) and can be presented for optical coupling with optical fibers of a mating component (e.g., another fiber optic connector; not shown) when the housing 318 is inserted into an adapter, receptacle, or the like. The connector 300 may also include a cover portion or dust cap 305 configured to be coupled with an end portion 330 of the ferrule 316 to protect the ferrule 316 and the optical fibers 302 therein.

Although the drawings illustrate the ferrule 316 terminating twelve fibers of the multi-fiber cable 312, it should be appreciated that the ferrule 316 can be configured to terminate less than twelve fibers or more than twelve fibers of a multi-fiber cable. For example, in some aspects, the ferrule 316 may be configured to terminate six fibers of a multi-fiber cable, and in other aspects, the ferrule 316 may be configured to terminate twenty-four fiber of a multi-fiber cable.

Referring to FIGS. 5-8, the connector 300 also includes a sub-assembly portion or adapter sub-assembly 332 that includes an adapter portion or ferrule adapter 334, a biasing portion 336, and a retaining portion or retaining member 338. The ferrule adapter 334 includes a pair of channels 337 configured to receive the pins 366 extending through the ferrule adapter 334. The ferrule adapter 334 includes bore portions 331 configured to receive flange portions 367 of the pins 366 and narrowed neck portions 333 configured to define shoulders 335 that limit forward movement of the pins 366 relative to the ferrule adapter 334. For example, each of the pins 366 includes a flange portion 367 configured to be received in one of the bore portions 331 but that is too large to be received by the narrowed neck portion 333 and engages the shoulder 335 to limit forward movement. An elongated portion 370 of each pin 366 extends in the forward direction from the flange portion 367 and configured to be received in a respective one of the channels 337 of the ferrule adapter 334 and an external channel 317 of the ferrule 316. That is, each channel 337 of the ferrule adapter 334 and a respective one of the external channels 317 of the ferrule 316 cooperate to define a bore configured to receive the pin 366.

The biasing portion 336 is configured to evenly bias the ferrule 316 and the ferrule adapter 334 in a forward direction relative to the housing 318. That is, the biasing portion 336 is configured to apply separate biasing forces to the adapter portion 334 on opposite sides of the fibers so as to urge the ferrule portion 316 in a forward direction such that the biasing forces are balanced on opposite sides of the fibers.

As illustrated, the biasing portion 336 may comprise two biasing members 3361, for example, springs. The biasing member 336 comprises a first biasing member 3361 configured to extend on a first side of the fibers of the multifiber cable and a second biasing member 3361 configured to extend on a second side of the fibers of the multifiber cable. The biasing members 3361 may comprise compression springs or the like. The first biasing member 3361 is configured to apply a first biasing force adjacent to a first side of the fibers and the second biasing member 3361 is configured to apply a second biasing force adjacent to a second side of the fibers. The second side of the fibers is located on an opposite side of the fibers relative to the first side of the fibers. The first biasing force and the second biasing force are configured to provide a balanced biasing force on opposite sides of the fibers.

As illustrated, each of the springs 3361 includes a first end portion 346 that is pressed over a rear portion 369 of a respective one of the pins 366 that extends in a rearward direction from the flange portion 367. The rear portion 369 may include a first portion 3691 onto which the first end portion 346 of the spring 3361 is pressed and a second portion 3692, having a narrower diameter than the first portion 3691, that extends further into the spring 366. Each of the springs 3361 includes a second end portion 347 configured to be pressed into the retaining member 338, as discussed in more detail below.

Figure 8:
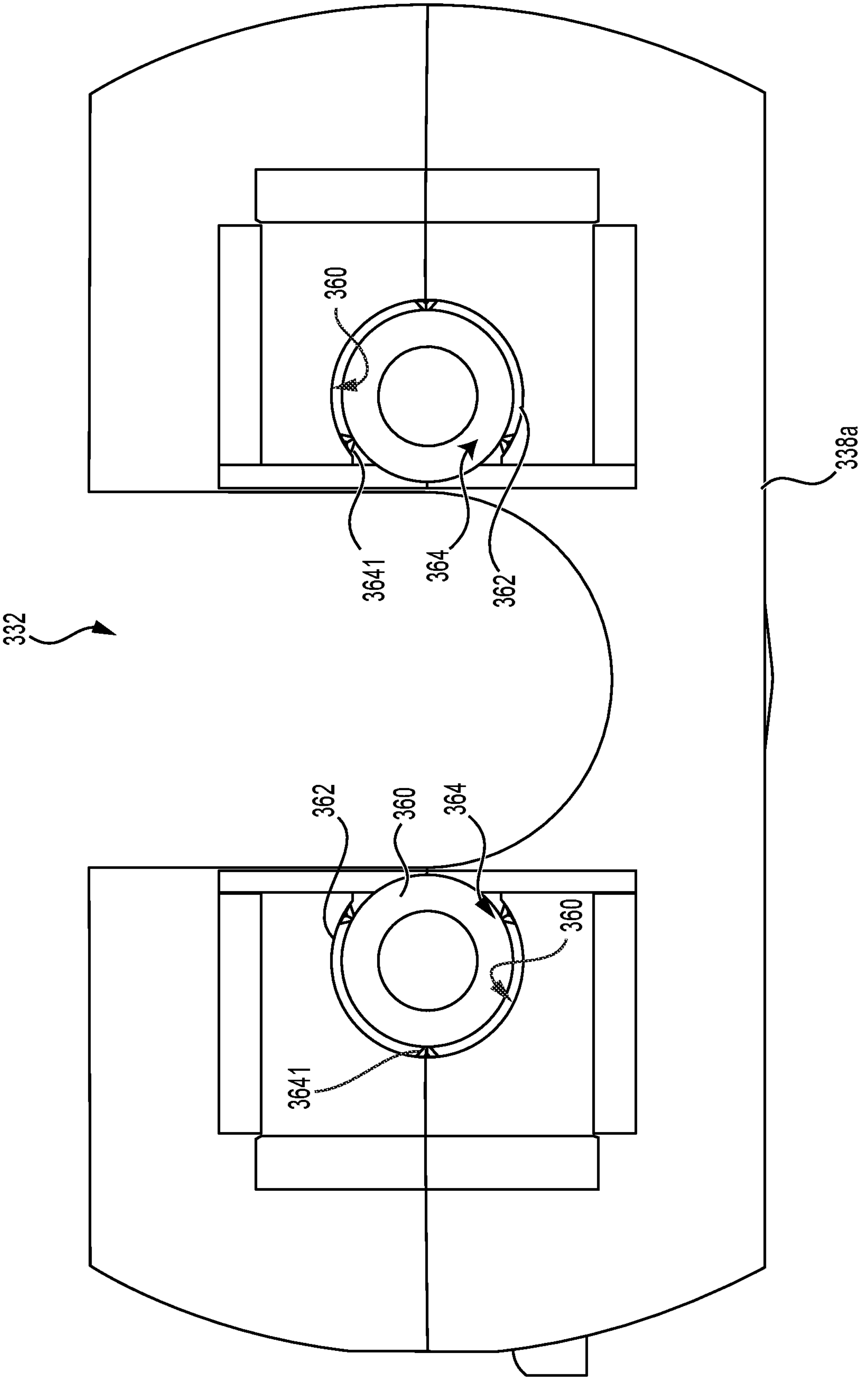
FIG. 8 is a front view of the biasing members and retaining member of the adapter sub-assembly of FIG. 5.
Figure 9:
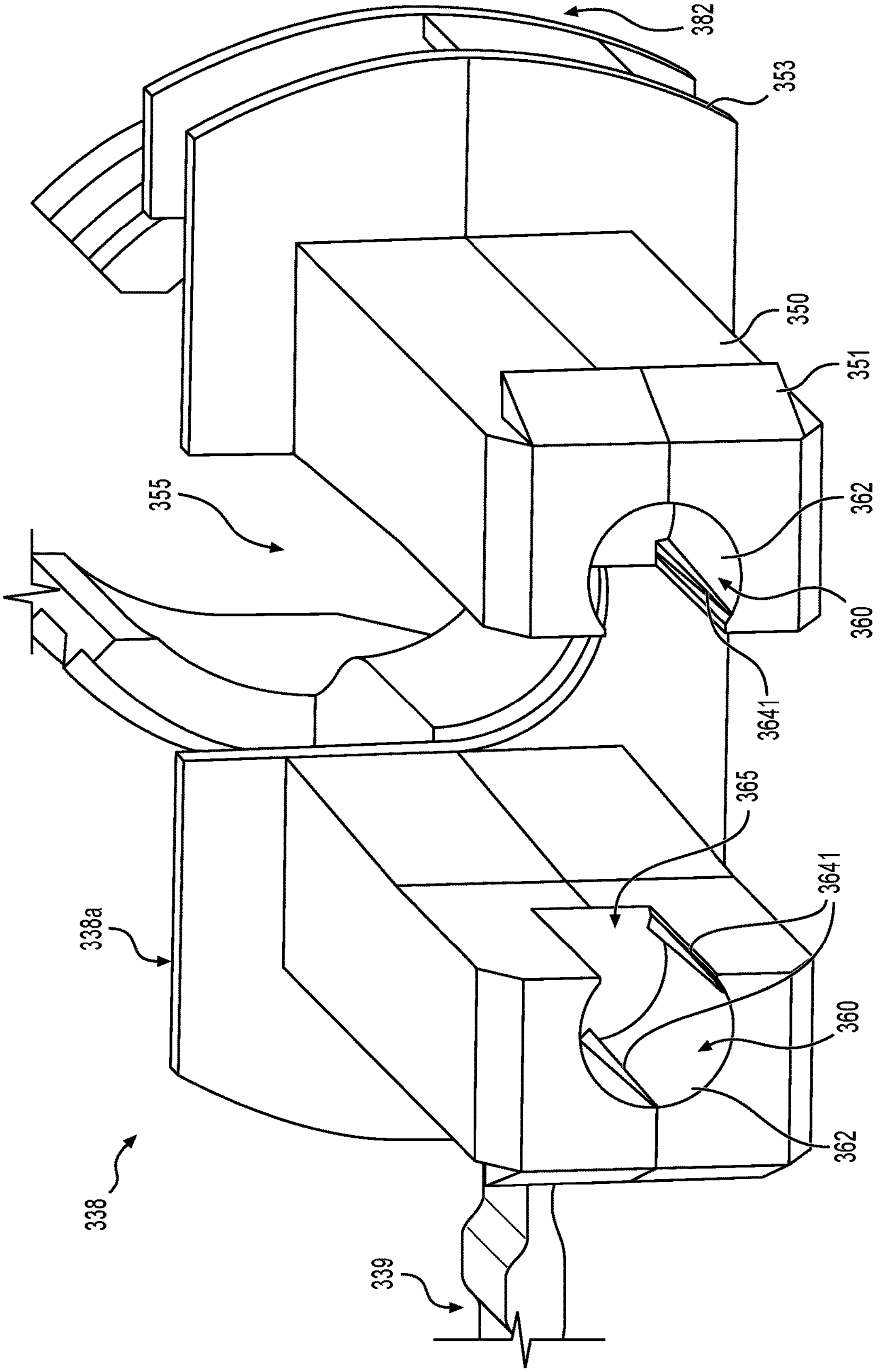
FIG. 9 is a front perspective view of the retaining member of the adapter sub-assembly of FIG. 5.

The retaining member 338 is configured as a one-piece monolithic structure of unitary construction and includes a hinge portion 339, for example, a living hinge. The retaining member 338 may include a coupling portion 350, which, in some aspects, may include a pair of forward extending latching arms 3501, each of which includes an engaging portion 351, for example, one or more outward extending protrusions 3511, configured to engage a receiving portion 352, for example, a notch, recess, or opening, in a side wall 3181 of the housing 318 to couple the retaining member 338 with the housing 318. In the illustrated embodiment, each of the latching arms 350 includes a partial blind bore configured to receive the second end portion 347 of a respective one of the springs 336. As best illustrated in FIGS. 8 and 9, when viewed from the forward end, each of the latching arms 3501 includes a receiving feature 360, for example, a bore, defined by an annular wall 362 that forms a portion of a circumference of the bore 360. For example, in some aspects, the annular wall 362 may extend circumferentially greater than 240°, but less than a full 360°. The annular wall 362 may include a retaining structure 364 configured to receive the spring 336 in a press fit or interference fit relationship. For example, the retaining structure 364 may comprise one or more ribs 3641 that extend radially inward along a length of the bore 360. As shown, the ribs 3641 may have a radially dimension that increases in the rearward direction to a forward facing end wall portion 365 of the bore 360. In some aspects, the annular wall 362 may include three ribs 3641 spaced apart by about 120°. The second end portion 347 of each spring 336 is each pressed in a respective one of the bores 360 and gripped by the ribs 3641 (FIG. 8). As such, the pressing of the springs 336 onto the pins 366 and into the bores 360 is configured to hold the adapter sub-assembly 332 together.

Figure 17:
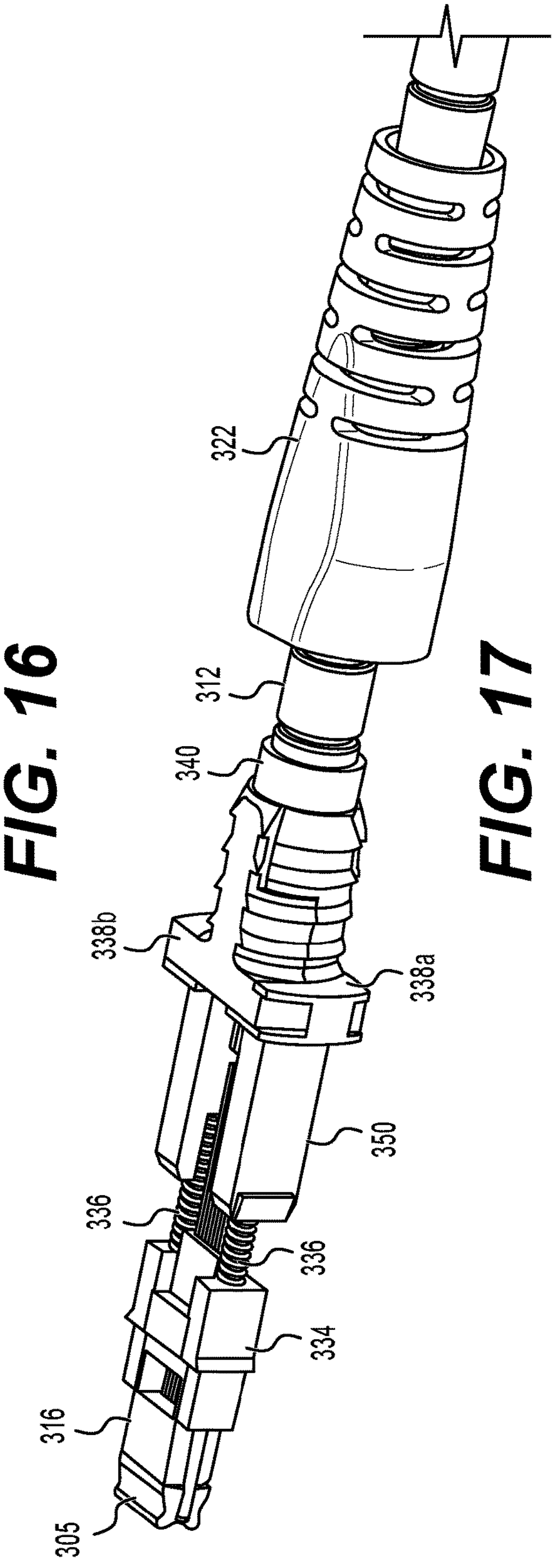
FIG. 17 is a perspective view of the ferrule assembly of the fiber optic connector of FIG. 3 coupled with the retaining member of the adapter sub-assembly of FIG. 5.
Figure 18:
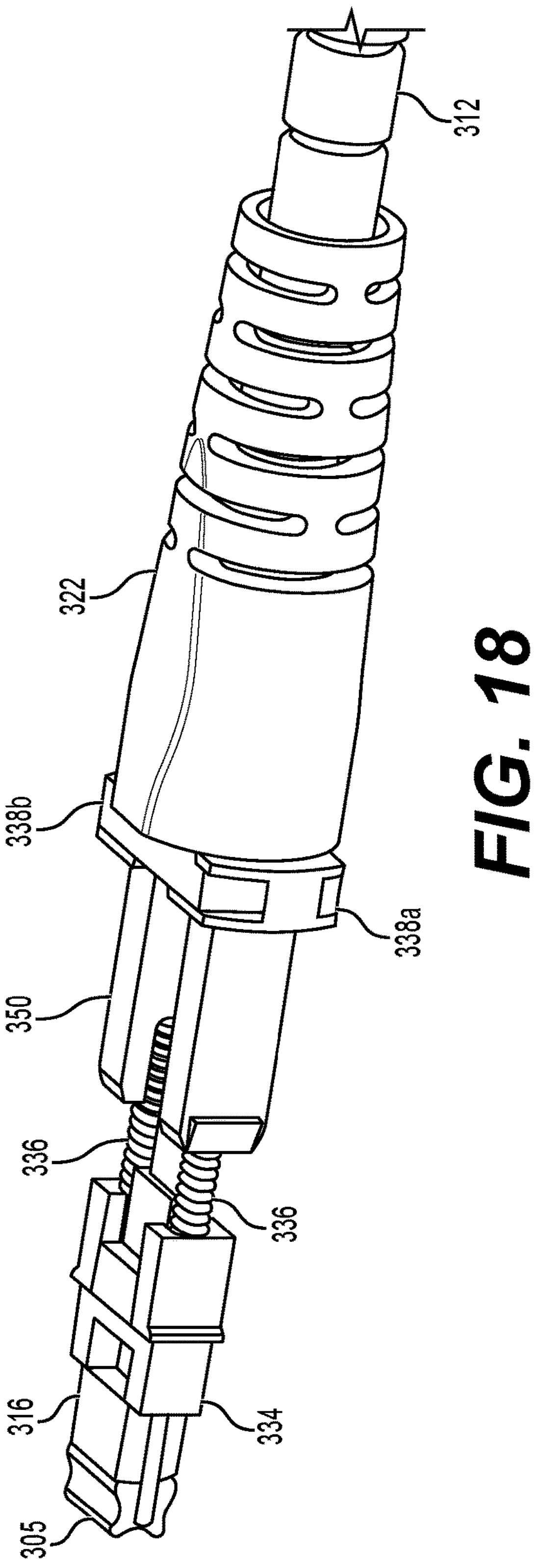
FIG. 18 is a perspective view of the coupled ferrule assembly and adapter sub-assembly of FIG. 17 with the boot coupled with the retaining member.

Referring again to FIGS. 5-7, the retaining member 338 includes a rear body portion 348 that may include two body portions 338*a*, 338*b* connected to one another by the hinge portion 339. The hinge portion 339 permits the two body portions 338*a*, 338*b* to be moved from an open configuration, as shown in FIGS. 5-7, 11, and 16, to a closed configuration, as shown in FIGS. 17 and 18. A first body portion 338*a* may include a coupling feature 382, for example, a catch or catch portion, and a second body portion 338*b* may include a coupling structure 380, for example, a latch or latch portion. In the open configuration, the coupling structure 380 and the coupling feature 382 are disposed at opposite transverse sides of the rear body portion 348. When the two body portions 338*a*, 338*b* are pivoted or folded toward one another about the hinge portion 399 toward the closed configuration, the coupling structure 380 is configured to be received by the coupling feature 382. The coupling structure 380 and the coupling feature 382 are configured to engage one another to maintain the two body portions 338*a*, 338*b* in the closed configuration.

The first body portion 338*a* may include a semi-annular groove portion 388*a* defined between a forward end wall portion 353 and a semi-cylindrical portion 354*a* of the first body portion 338*a* that extends in a rearward direction from the semi-annular groove 388*a*. The second body portion 338*b* may include a notched end portion 388*b* and a semi-cylindrical portion 354*b* that extends in a rearward direction from the notched end portion 338*b*. The notched end portion 388*b* is configured to be aligned with the semi-annular groove portion 388*a* when the two body portions 338*a*, 338*b* are in the closed configuration to define an annular groove. The semi-cylindrical portion 354*a* of the first body portion 338*a* is configured to be aligned with the semi-cylindrical portion 354*b* of the second body portion 338*b* when the two body portions 338*a*, 338*b* are in the closed configuration to define a through bore 355.

Figure 10:
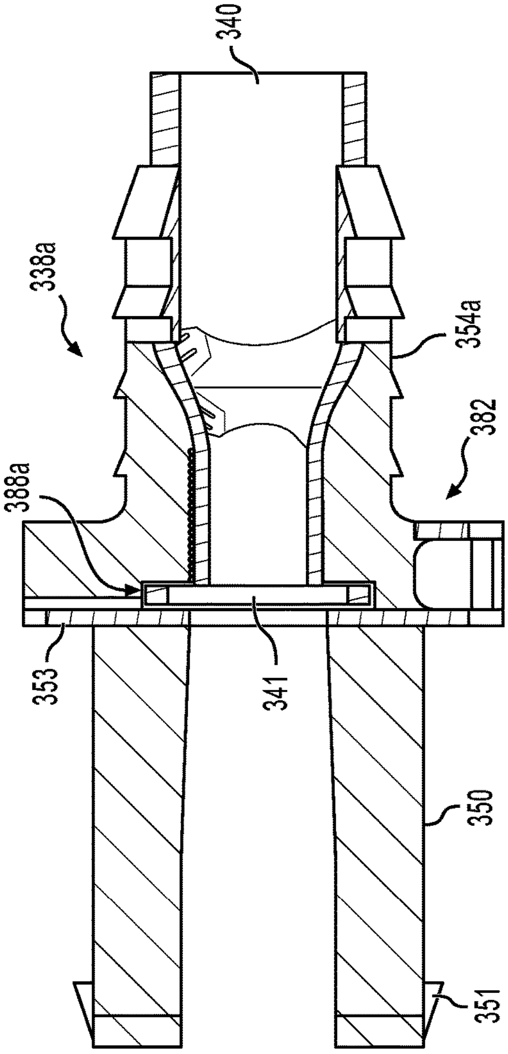
FIG. 10 is a top view of a portion of the retaining member of the adapter sub-assembly of FIG. 5 with a crimp sleeve received therein.
Figure 11:
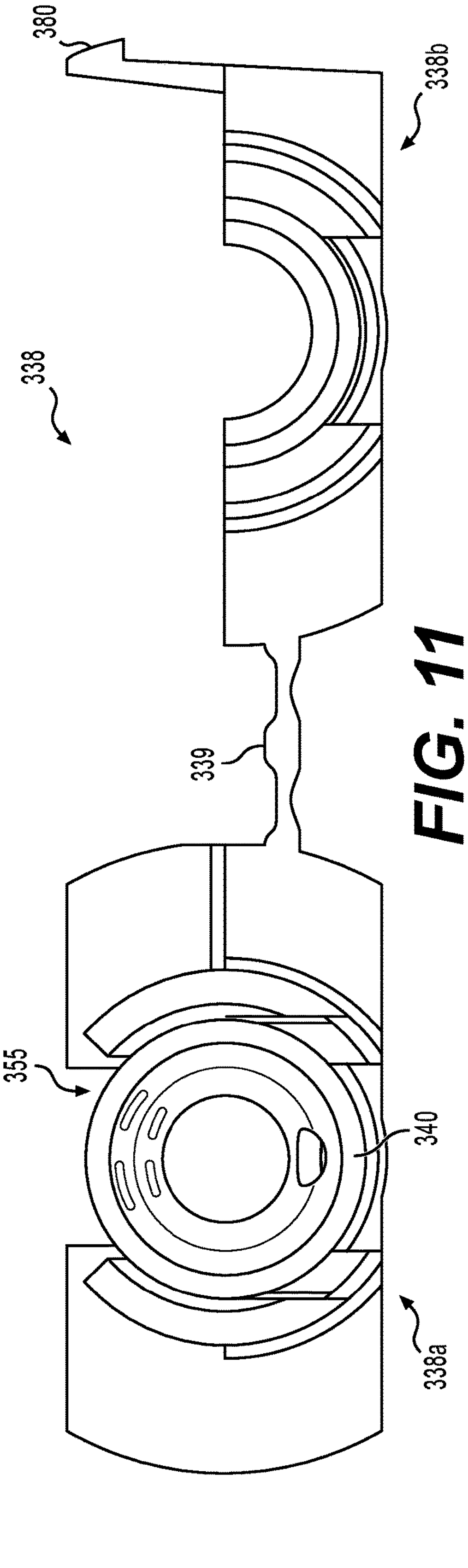
FIG. 11 is a rear view of the retaining member of the adapter sub-assembly of FIG. 5 with a crimp sleeve received therein.

As illustrated in FIGS. 4 and 10, the semi-annular groove portion 388*a* is configured to receive a flange portion 341 of a coupling portion 340, for example, a crimp sleeve, which is configured to be crimped to an end of the cable 312, when the two body portions 338*a*, 338*b* are in the open configuration. The notched end portion 388*b* is configured to receive the flange portion 341 when the two body portions 338*a*, 338*b* are in the closed configuration. The semi-annular groove portion 388*a* and/or the notched end portion 388*b* may include a flattened portion 389, and the flange portion 341 may include one more flattened portions 349 arranged to be aligned with the flattened portion(s) of the semi-annular groove(s) to prevent rotation of the coupling portion 340, and thus the cable 312 and fibers 302, relative to the retaining member 338. Of course, alternative keying structures may be employed in place of the flattened portions. An inner support sleeve (not shown) may be inserted beneath the jacket of the cable 312 to protect the fibers 302 when the coupling portion 340 is crimped to the cable 312.

The retaining member 338 is configured to be inserted into the housing 318 when the connector 300 is assembled, and the projection 3511 of each of the latching arms 350 is configured to engage the opening 352 in a respective one of the side walls 3181 of the housing 318. The springs 3361 are configured to be compressed when the retaining member 338 is inserted into the housing 318 and to exert a biasing force on the ferrule 316 via the ferrule adapter 334. The ferrule adapter 334 includes a retaining structure 3341 configured to interact with a retaining structure 3182, for example, a shoulder or stop, formed within the housing 318 to retain the ferrule 316 and the ferrule adapter 334 within the housing 318. The boot 322 covers a rear portion of the retaining member 338, as shown in FIG. 3, and provides strain relief for the optical fibers 302 by limiting the extent to which the connector 300 can bend relative to the cable 312. The rear body portion 348 of the retaining member 338 may include barbs 3481 configured to grip the boot 322.

To insert the connector 300 into an adapter or receptacle, the connector 300 is configured such that a user grasps the boot 322 and pushes the connector 300 into the adapter or receptacle. The pins 366 are configured to be received by a mating connector (not shown) at the adapter or receptacle 301 (FIG. 21), thereby allowing the housing to be fully inserted for proper engagement/mating with the adapter or receptacle. To disengage the connector 300 from an adapter or receptacle 301, the user grasps and pulls the slider 320, which may be biased by a biasing portion 356 relative to the housing 318, away from the adapter or receptacle. The biasing portion 356 may comprise two springs 3561, for example, compression springs. This way, pull forces are transferred directly to the housing 318 (rather than the cable 312) to disengage the housing 318 from the adapter or receptacle 301.

Figure 12:
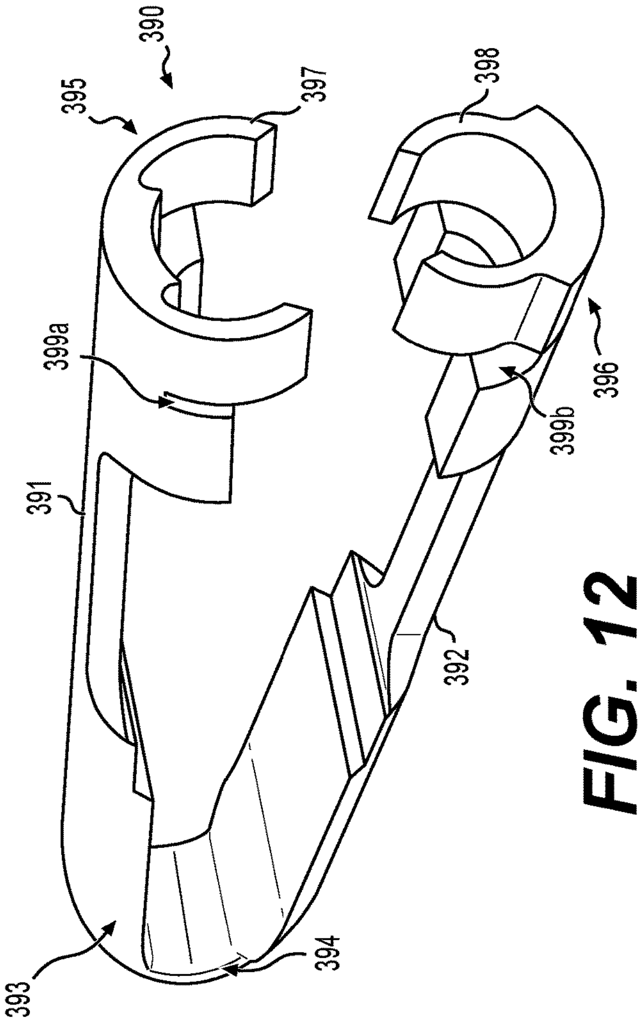
FIG. 12 is a perspective view of an exemplary protective cap for use with the ferrule assembly of the fiber optic connector of FIG. 3.
Figure 13:
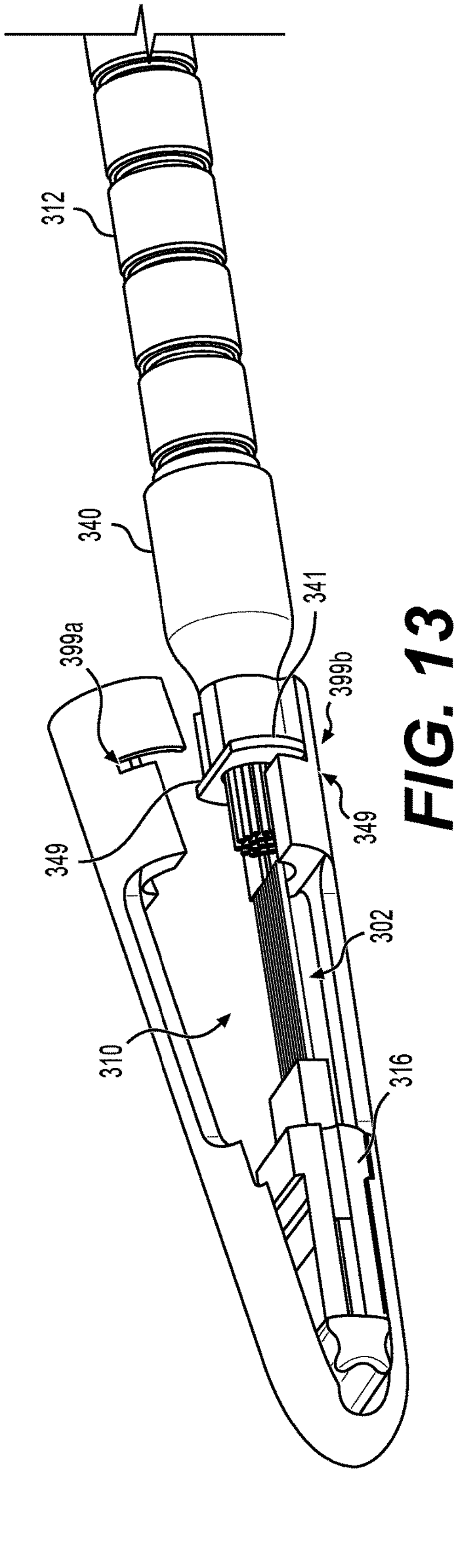
FIG. 13 is a perspective view of the protective cap of FIG. 12 receiving the ferrule assembly of the fiber optic connector of FIG. 3.

Referring now to FIGS. 12-20, a process for advancing the cable 312 terminated with the crimp sleeve 340 and the ferrule 316 through a duct and assembling the MPO connector 300 is illustrated and described. FIG. 12 illustrates an exemplary protective cap 390 for use with the ferrule assembly 310 to advance the ferrule assembly through a duct. The protective cap 390 can eliminate sharp edges and blunt faces to facilitate pushing through a duct. FIG. 13 illustrates the ferrule assembly 310 configured to be pushed through a duct, for example a duct having an inner diameter less than 10 mm and, in some cases, a duct having an inner diameter of 5.5 mm. The ferrule assembly 310 includes the ferrule 316 terminating the plurality of fibers 302 and the crimp sleeve 340 crimped on the end of the cable.

Figure 14:
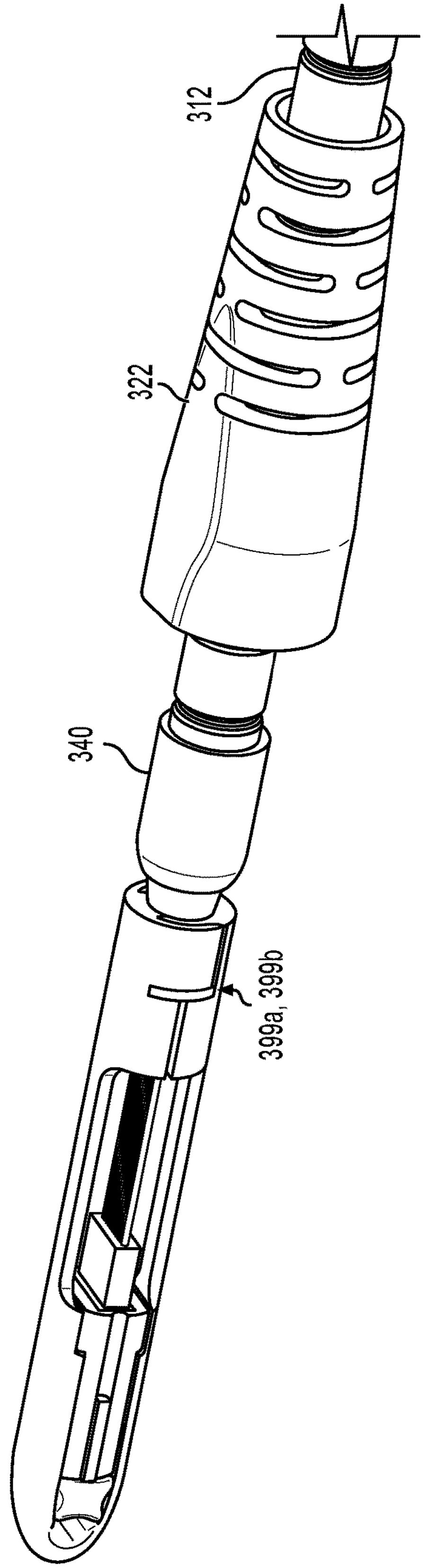
FIG. 14 is a perspective view of the protective cap of FIG. 12 coupled with the ferrule assembly of the fiber optic connector of FIG. 3.

Referring to FIG. 13, the protective cap 390 is configured to be placed over the ferrule assembly 310 to protect the ferrule 316 and the fibers 302. The cap 390 may include a pair of fingers 391, 392 having respective first ends 393, 394 that are hingedly connected to one another and second ends 395, 396 that are configured to be coupled with one another. As shown in FIGS. 12 and 13, in an open configuration of the cap 390, the second ends 395, 396 are spaced apart from one another. The second ends 395, 396 include arcuate retaining members 397, 398 sized such that a first one of the retaining members 397 can be received and retained by a second one of the retaining members 398 in a nested, snap-fit relationship, as shown in FIG. 14, when the cap is in a closed configuration. Each of the second ends 395, 396 also includes a semi-annular groove 399*a*, 399*b* configured to combine with one another to form an annular groove adjacent the arcuate retaining members 397, 398. The semi-annular grooves 399*a*, 399*b* are configured to receive the flange portion 341 of the crimp sleeve 340. One or both of the semi-annular grooves 399*a*, 399*b* may include a flattened portion, and the flange portion 341 may include one more flattened portions 349 arranged to be aligned with the flattened portion(s) of the semi-annular groove(s) to prevent rotation of the crimp sleeve 340, and thus the cable 312 and fibers 302, relative to the cap 390.

Figure 15:
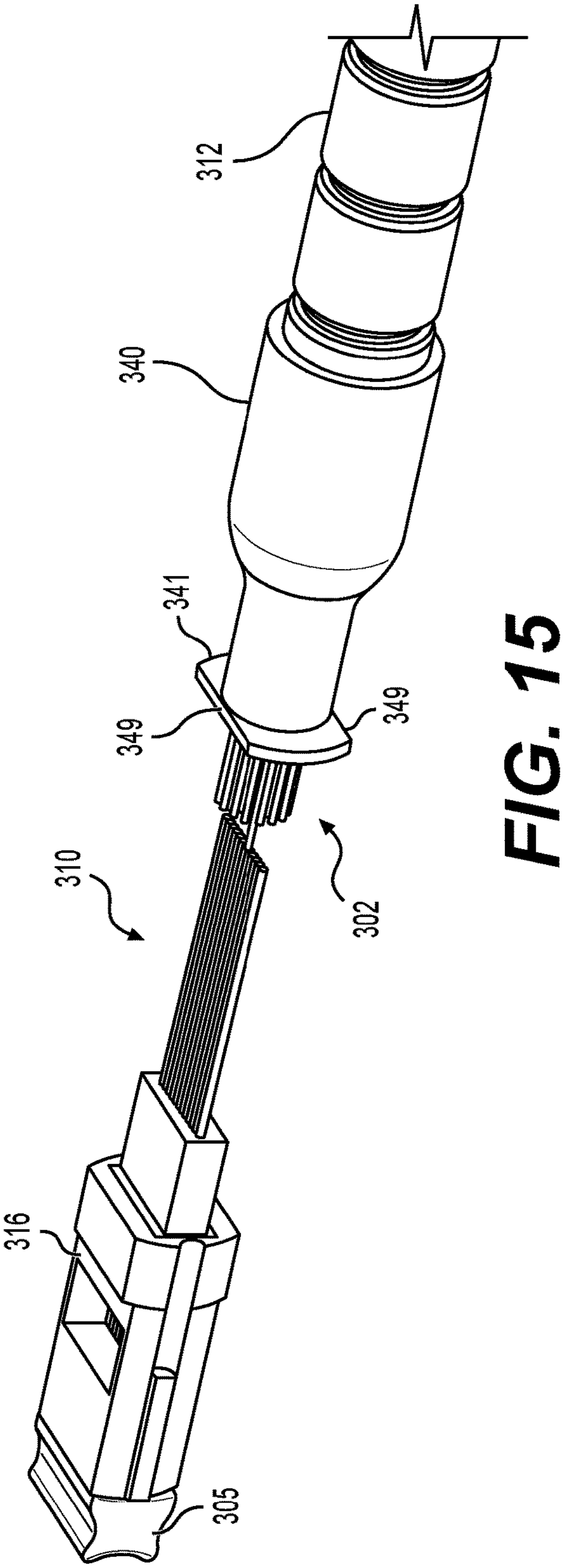
FIG. 15 is a perspective view of the ferrule assembly of the fiber optic connector of FIG. 3 with the protective cap of FIG. 12 removed.

As shown in FIG. 13, the flange portion 341 of the crimp sleeve 340 is inserted into the first one of the arcuate retaining members 397 having a smaller inside diameter, and then the second one of the arcuate retaining members 398 is snapped over the first one of the arcuate retaining members 397, as shown in FIG. 14, to close the cap 390. With the cap 390 closed and secured on the crimp sleeve 340, the ferrule assembly 310 is ready to be advanced through a duct. Once the ferrule assembly 310 with cap 390 is advanced to a desired location (e.g., a connection location of a fiber distribution system), the cap 390 is removed by unsnapping the arcuate retaining members 397, 398 from one another, thus releasing the crimp sleeve 340, as shown in FIG. 15.

Figure 16:
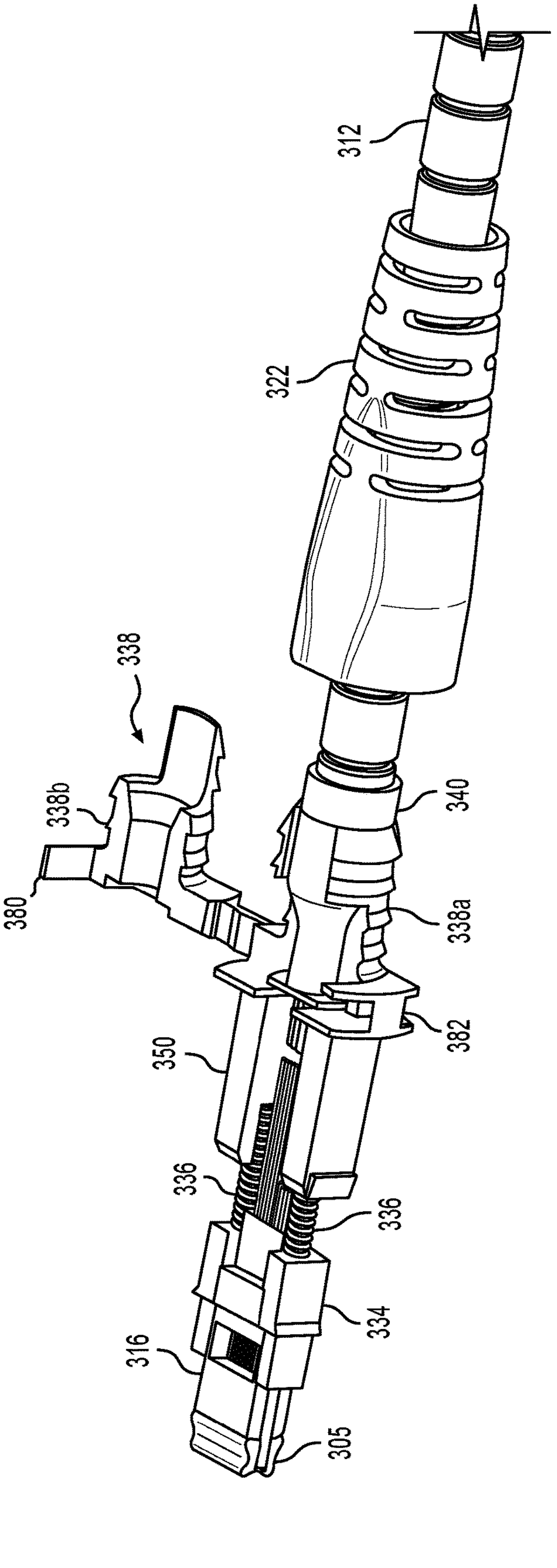
FIG. 16 is a perspective view of the ferrule assembly of the fiber optic connector of FIG. 3 being received by the retaining member of the adapter sub-assembly of FIG. 5.

Next, as shown in FIG. 16, the boot 322 can be moved rearwardly over the ferrule assembly 310 and beyond the crimp sleeve 340 onto the fiber cable 312. The crimp sleeve 340 can then be placed into the retaining member 338 while the two body halves 338*a*, 338*b* are in the open configuration. For example, the flange portion 341 can be placed into the semi-annular groove 388*a* of the first body half 338*a*, a neck portion 342 of the crimp sleeve 340 can be placed into the semi-cylindrical portion 354*a* of the first body half 338*a*, and an enlarged portion 343 of the crimp sleeve 340 can be placed into the rear portion 358 of the first body half 338*a*. The rear portion 358 may be a semi-annular structure configured to resiliently expand to receive the enlarged portion 343 of the crimp sleeve 340 and then retract to securely retain the enlarged portion 343. Also, the fibers 302 extending from the fiber cable 312 to the ferrule 316 are positioned between the pair of forward extending latching arms 350 and between the springs 3361 in the transverse direction, and the ferrule 316 is forward of the latching arms 350. After the crimp sleeve 340 is securely retained by the retaining member 338, the second body half 338*b* can be pivoted about the hinge portion 339 toward the first body half 338*a*, and the latch 380 and the catch 382 can engage one another to maintain the two body halves 338*a*, 338*b* in the closed configuration, as shown in FIG. 17. Referring to FIG. 18, the boot 322 can be moved forwardly over the rear portion 358 of the retaining member 338.

Figure 19:
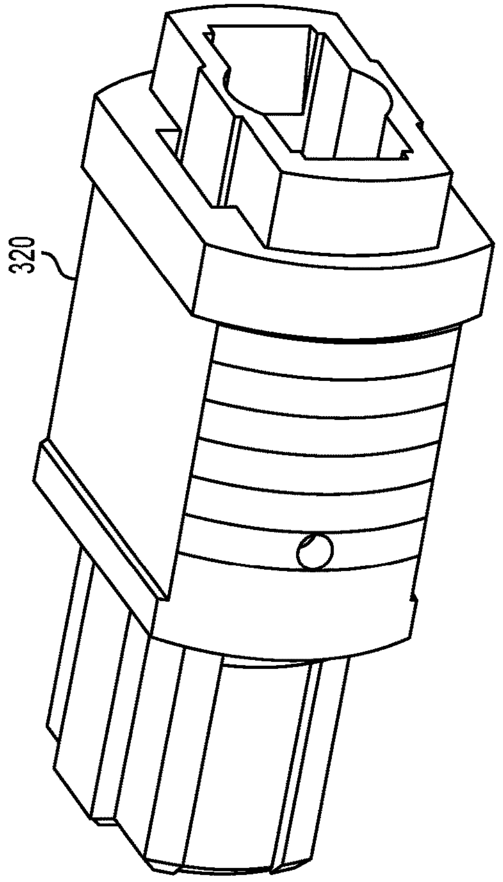
FIG. 19 is a perspective view of the housing of the fiber optic connector of FIG. 3.
Figure 20:
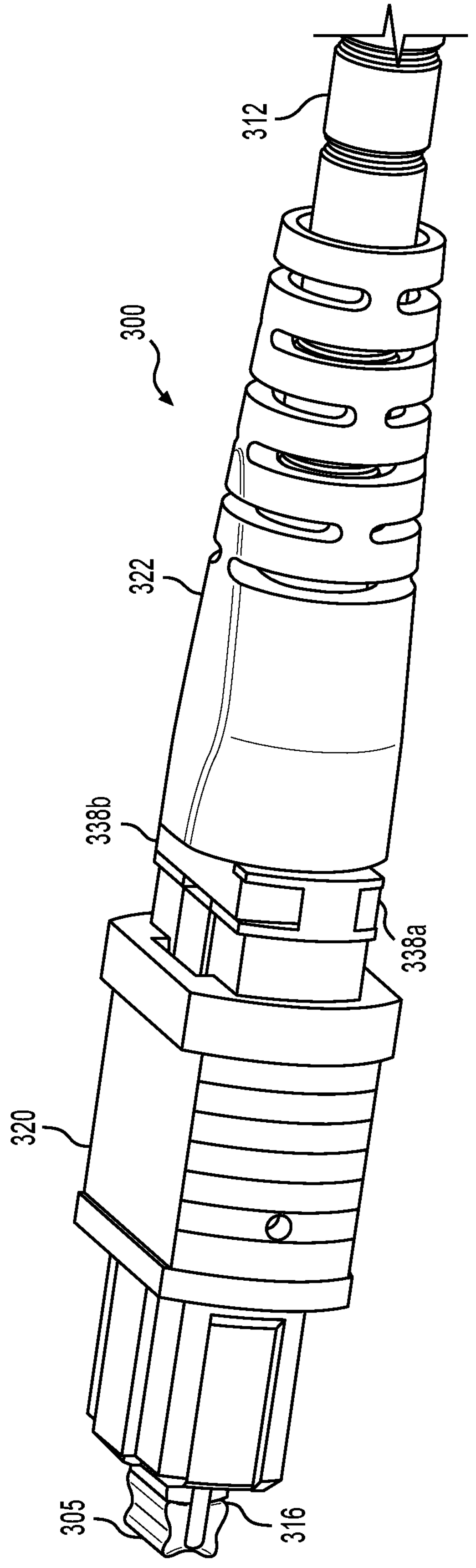
FIG. 20 is another perspective view of the fiber optic connector of FIG. 3.
Figure 21:
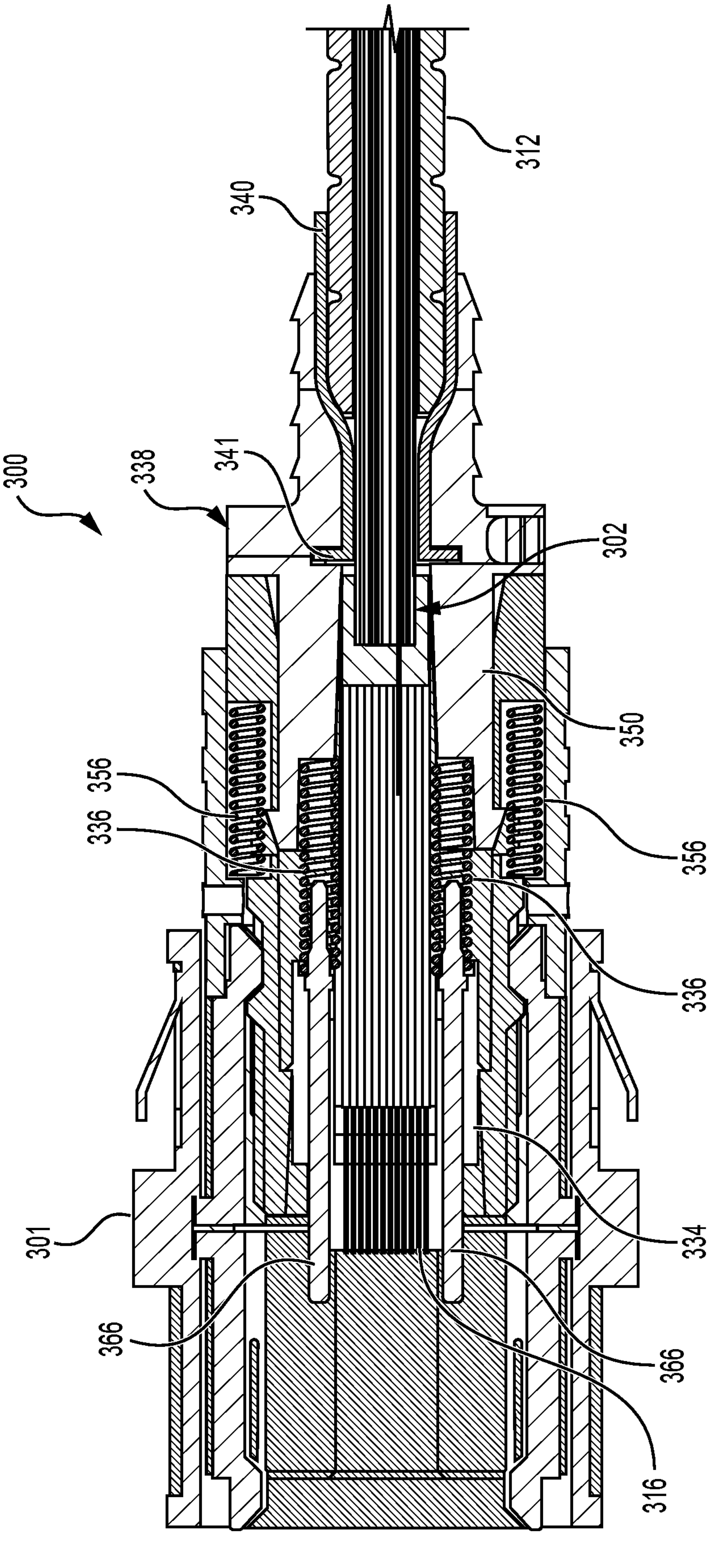
FIG. 21 is top cross-sectional view of the fiber optic connector of FIG. 3 coupled with an adapter.
Figure 22:
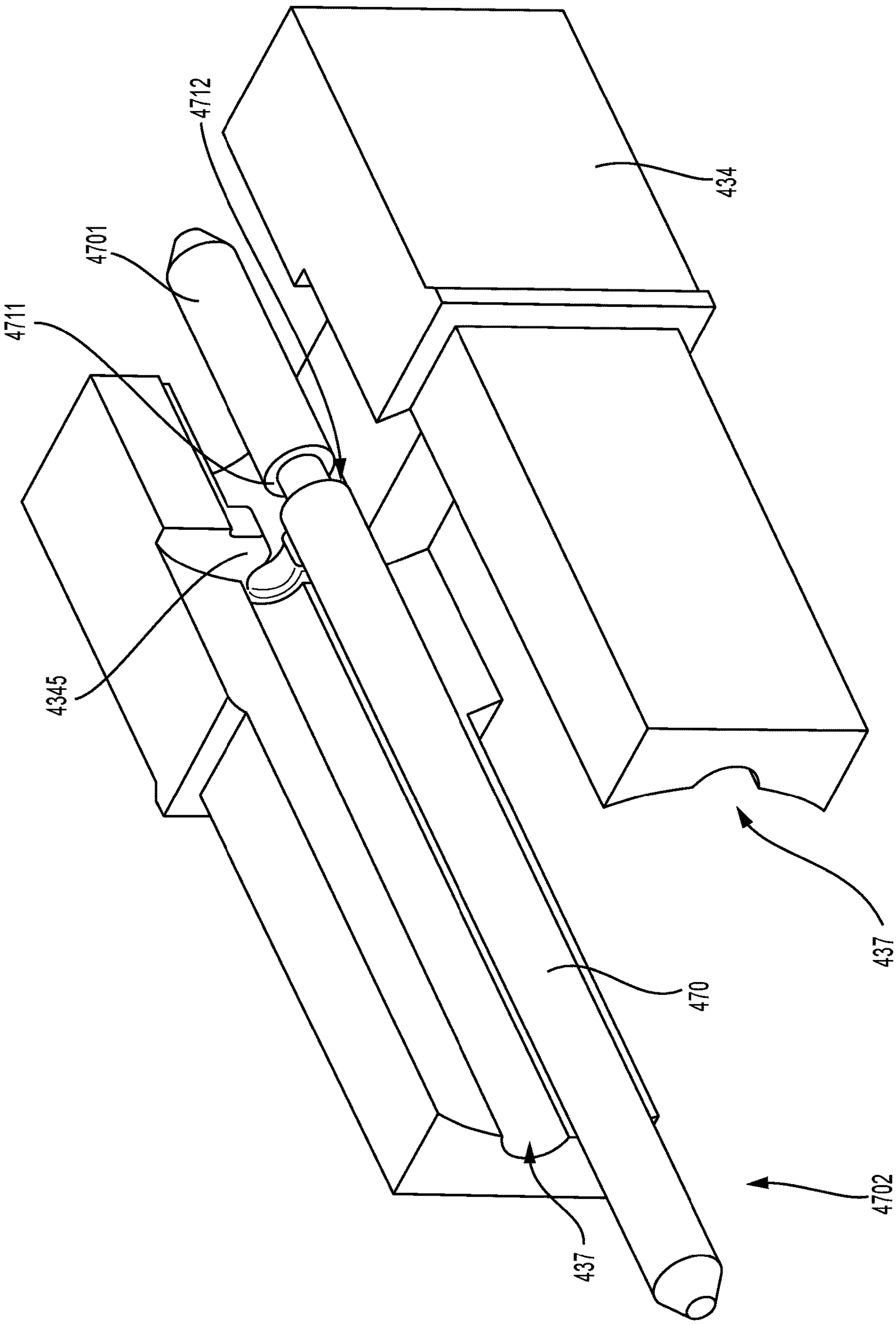
FIG. 22 is a perspective view of an alternate embodiment of an exemplary ferrule adapter in accordance with various aspects of the disclosure.
Figure 23:
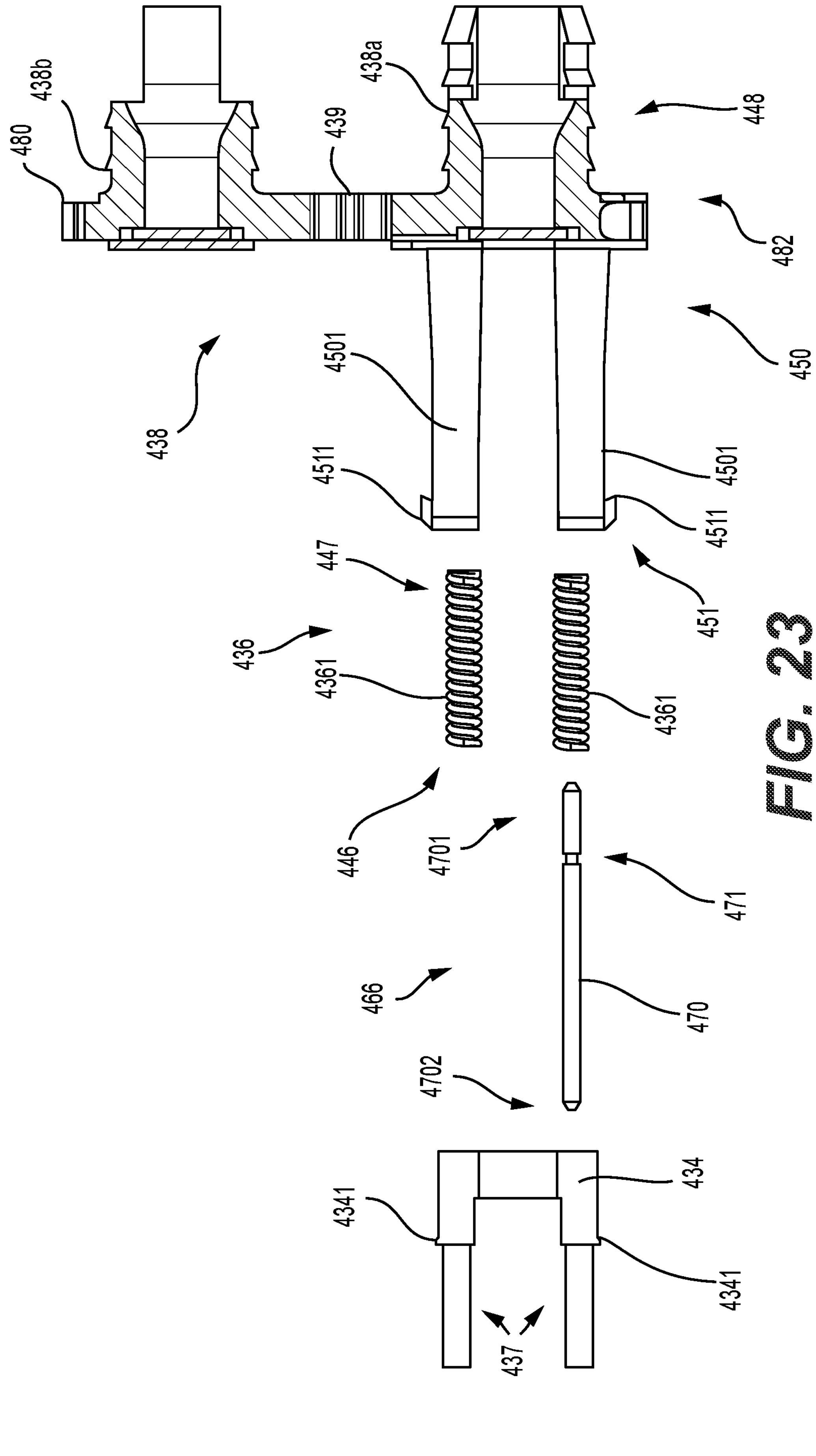
FIG. 23 is an exploded top view of an exemplary adapter sub-assembly including the ferrule adapter of FIG. 23.
Figure 24:
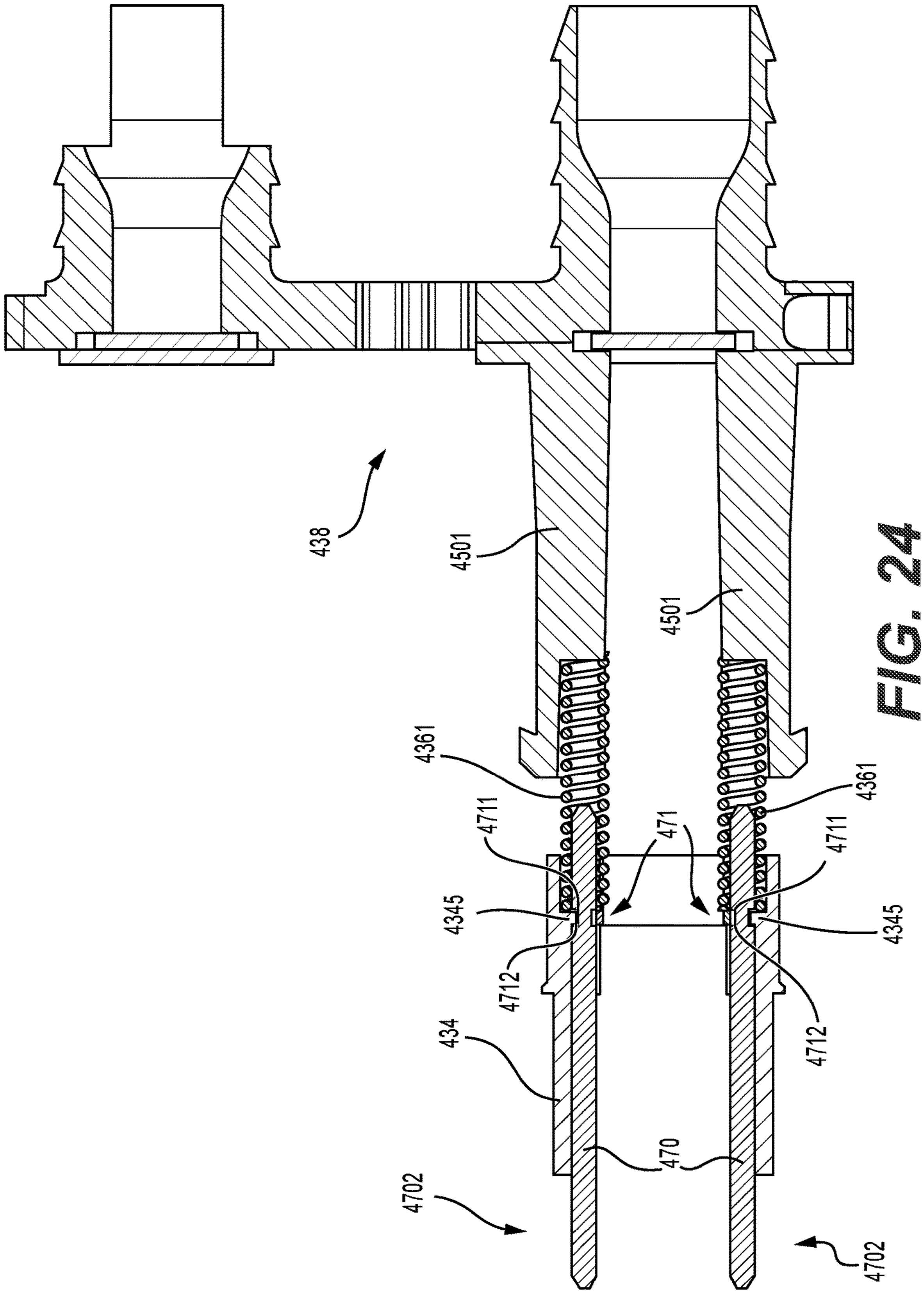
FIG. 24 is top cross-sectional view of the adapter sub-assembly of FIG. 23.

FIG. 19 illustrates an MPO housing 318 that is configured to be moved over the ferrule 316 and coupled with the retaining member 338, as shown in FIG. 20. For example, the housing 318 can be coupled with the retaining member 338 via the cooperating protrusions 351 of the latching arms 350 and the openings 352 in the side walls of the housing 318. The shell springs 356 and shell 320 can then be coupled with the housing 318. The shell 320 may include a recessed portion 321 at a bottom inner surface and/or a top inner surface having a forward facing shoulder configured to engage a rearward facing shoulder of a projection 319 extending from a bottom outer surface and/or a top outer surface of the housing 318.

Figure 25:
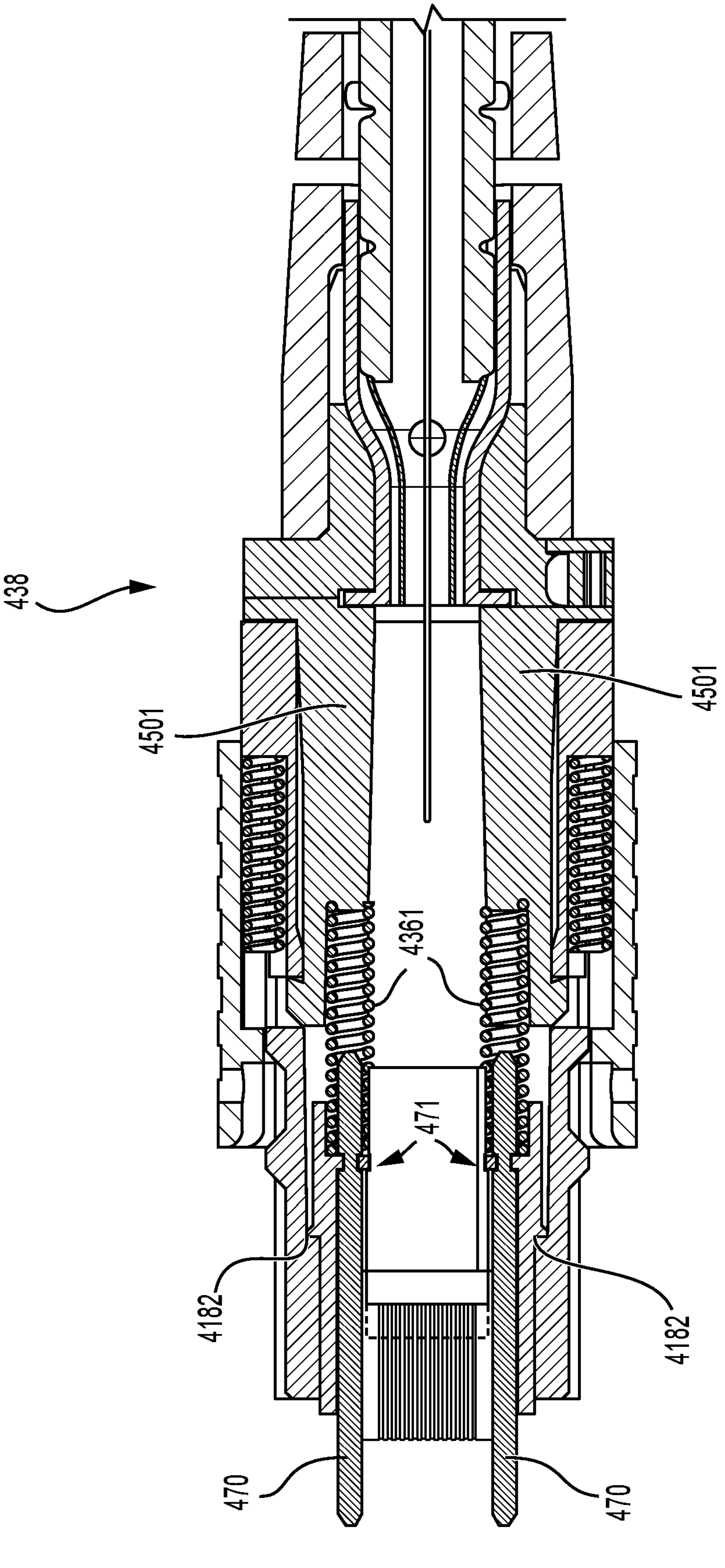
FIG. 25 is a top cross-sectional view of an exemplary fiber optic connector including the adapter sub-assembly of FIG. 24.

Referring now to FIGS. 22-25, an exemplary fiber optic connector 400 in accordance with various aspects of the disclosure is illustrated and described. The fiber optic connector is similar to the fiber optic connector 300 and is in the form of an MPO connector. As shown in FIGS. 25, the connector 400 may be installed on a fiber optic cable 312 ("cable") to form a fiber optic cable assembly. Similar to connector 300, the connector 400 may include a ferrule or ferrule portion (e.g., a mechanical transfer (MT) ferrule), a housing or housing portion configured to be received over the ferrule, a shell or shell portion configured to be received over the housing, and a boot or boot portion configured to be received over the cable 312.

The connector includes a sub-assembly portion or adapter sub-assembly 432 that includes an adapter portion or ferrule adapter 434, a biasing portion 436, and a retaining portion or retaining member 438. The ferrule adapter 434 includes a pair of channels 437 configured to receive the alignment portion 466 (e.g., guiding or alignment pins) extending through the ferrule adapter 434. The ferrule adapter 434 includes an engagement portion 4345 configured to receive the alignment portion 466. For example, the engagement portion 4345 may include a radial lip that extends inward from an inner surface of the channel 437 of the ferrule adapter 434 to define a forward facing surface and a rearward facing surface.

The alignment portion 466 may include an elongated pin 470 having a first end 4701 and a second end 4701. Between the first end 4701 and the second end 4702, the alignment portion 466 may include a receiving feature 471, for example, an annular groove or channel 4711 configured to receive the engagement portion 4345. The receiving feature 471 may include a first engagement surface 4711, for example a forward facing engagement surface, configured to engage a rearward facing surface of the engagement portion 4345 and a second engagement surface 4712, for example, a rear facing engagement surface, configured to engage the forward facing surface of the engagement portion 4345. The engagement portion 4345 and the receiving feature 471 are configured to couple the alignment portion 466 with the ferrule adapter 434 and limit forward movement of the alignment portion 466 relative to the ferrule adapter 434. Each channel 437 of the ferrule adapter 434 and a respective one of the external channels 417 of the ferrule 416 cooperate to define a bore configured to receive the alignment portion 466.

The biasing portion 436 is configured to evenly bias the ferrule and the ferrule adapter 434 in a forward direction relative to the housing. That is, the biasing portion 436 is configured to apply separate biasing forces to the adapter portion 434 on opposite sides of the fibers so as to urge the ferrule portion in a forward direction such that the biasing forces are balanced on opposite sides of the fibers.

As illustrated, the biasing portion 436 may comprise two biasing members 4361, for example, springs. The biasing member 436 comprises a first biasing member 4361 configured to extend on a first side of the fibers of the multifiber cable and a second biasing member 4361 configured to extend on a second side of the fibers of the multifiber cable. The biasing members 4361 may comprise compression springs or the like. The first biasing member 4361 is configured to apply a first biasing force adjacent to a first side of the fibers and the second biasing member 4361 is configured to apply a second biasing force adjacent to a second side of the fibers. The second side of the fibers is located on an opposite side of the fibers relative to the first side of the fibers. The first biasing force and the second biasing force are configured to provide a balanced biasing force on opposite sides of the fibers.

As illustrated, each of the springs 4361 includes a first end portion 446 that is disposed over a rear portion 469 of a respective one of the pins 470, for example, without being press fit onto the pin 470, and is configured to be pressed into a bore of the adapter portion 434 and a second end portion 447 that is configured to be pressed into the retaining member 438, as discussed in more detail below. The bore of the adapter portion 434 extends from a rear end of the adapter portion 434 to the rear facing surface of the engagement portion 4345.

The retaining member 438 is similar to the retaining member 338 discussed above including a rear body portion that includes two body portion 438*a*, 438*b*, a hinge portion 339, for example, a living hinge, a coupling structure 480, and a coupling feature 482. The retaining member 438 may include a coupling portion 450, which, in some aspects, may include a pair of forward extending latching arms 4501, each of which includes an engaging portion 451, for example, one or more outward extending protrusions 4511, configured to engage a receiving portion, for example, a notch, recess, or opening, in a side wall of the housing to couple the retaining member 438 with the housing. In the illustrated embodiment, each of the latching arms 450 includes a partial blind bore configured to receive the second end portion 447 of a respective one of the springs 436.

The retaining member 438 is configured to be inserted into the housing when the connector 400 is assembled, and the projection 4511 of each of the latching arms 450 is configured to engage the opening 352 in a respective one of the side walls 3181 of the housing 318. The springs 4361 are configured to be compressed when the retaining member 438 is inserted into the housing 318 and to exert a biasing force on the ferrule 316 via the ferrule adapter 434. The ferrule adapter 434 includes a retaining structure 4341 configured to interact with a retaining structure 3182, for example, a shoulder or stop, formed within the housing 318 to retain the ferrule 316 and the ferrule adapter 434 within the housing 318. A boot may cover a rear portion of the retaining member 438 and provide strain relief for the optical fibers 302 by limiting the extent to which the connector 400 can bend relative to the cable 312. The rear body portion 448 of the retaining member 438 may include barbs configured to grip the boot.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A multi-fiber push on (MPO) connector that is configured to be field assembled comprising:

a ferrule portion structurally arranged to terminate fibers of a multi-fiber cable;

a sub-assembly portion including an adapter portion that is structurally arranged to be coupled with the ferrule portion, a retaining portion that is structurally arranged to be coupled with the multi-fiber cable, and a biasing portion that is structurally arranged to extend on opposite sides of the fibers of the multi-fiber cable and to couple the adapter portion with the retaining portion;

wherein the adapter portion includes an adapter front face portion and the ferrule portion includes a ferrule front face portion, and wherein the adapter front face portion and the ferrule front face portion are structurally arranged to collectively define a front face portion of an MPO connector ferrule;

wherein the ferrule portion is structurally arranged to be pushed through a duct having an inside diameter smaller than a lateral dimension of the front face portion of the MPO connector ferrule;

wherein the biasing portion is structurally arranged to be coupled with the adapter portion and the retaining portion to couple the adapter portion with the retaining portion;

wherein the biasing portion is structurally arranged to apply separate biasing forces to the adapter portion on opposite sides of the fibers so as to urge the ferrule portion in a forward direction such that the biasing forces are balanced on opposite sides of the fibers;

wherein the adapter portion, the retaining portion, and the biasing portion are structurally arranged to be coupled together to assemble the sub-assembly portion such that the assembled sub-assembly portion can be coupled with the ferrule portion; and wherein the sub-assembly portion is structurally arranged to permit field assembly of the MPO connector by providing the adapter portion with an opening structurally arranged to allow fibers that are preterminated with the ferrule portion to be placed between lateral portions of the adapter portion from a direction transverse to the forward direction so as to permit the sub-assembly portion to couple with the ferrule portion after the ferrule portion terminates the fibers.

2. The connector of claim 1, wherein the biasing portion comprises two biasing portions disposed parallel to one another on opposite sides of the fibers when the sub-assembly portion is coupled with the ferrule portion.

3. The connector of claim 2, wherein each of the biasing portions comprises a compression spring.

4. The connector of claim 1, wherein the retaining portion comprises two body portions that are structurally arranged to be connected to one another by a hinge portion.

5. The connector of claim 4, wherein the retaining portion comprises a single monolithic structure of unitary construction, and the hinge portion comprises a living hinge.

6. The connector of claim 1, wherein the connector further comprises:

a housing portion structurally arranged to be coupled with the retaining member;

a shell portion structurally arranged to be coupled with the housing;

wherein the shell portion is structurally arranged to house a second biasing portion structurally arranged to bear against a forward-facing surface of the housing portion and a rearward facing surface of the shell portion to urge the shell portion in the forward direction; and wherein the connector is structurally arranged to be disconnected from a mating adapter by urging the shell portion in a rearward direction against a force of the biasing portion, thereby transferring an urging force to the housing rather than the cable.

7. The connector of claim 1, wherein the ferrule portion is structurally arranged to include first receiving portions at opposing laterals sides of the ferrule portion, wherein the adapter portion is structurally arranged to include second receiving portions that oppose the first receiving portions of the ferrule portion, and wherein the first receiving portions and the second receiving portions are structurally arranged to cooperate to define receiving structures structurally arranged to receive an alignment portion.

8. The connector of claim 7, wherein the receiving structures are structurally arranged to receive alignment members from a mating MPO connector.

9. A multi-fiber push on (MPO) connector that is structurally arranged to be field assembled comprising:

a ferrule portion structurally arranged to terminate fibers of a multi-fiber cable;

a sub-assembly portion including an adapter portion that is structurally arranged to be coupled with the ferrule portion, a retaining portion that is structurally arranged to be coupled with the multi-fiber cable, and a biasing portion that is structurally arranged to extend on opposite sides of the fibers of the multi-fiber cable and to couple the adapter portion with the retaining portion;

wherein the biasing portion is structurally arranged to apply separate biasing forces to the adapter portion on opposite sides of the fibers so as to urge the ferrule portion in a forward direction such that the biasing forces are balanced on opposite sides of the fibers; and wherein the sub-assembly portion is structurally arranged to permit field assembly of the MPO connector by providing the adapter portion with an opening structurally arranged to allow fibers that are preterminated with the ferrule portion to be placed between lateral portions of the adapter portion from a direction transverse to the forward direction so as to permit the sub-assembly portion to couple with the ferrule portion after the ferrule portion terminates the fibers.

10. The connector of claim 9, wherein the adapter portion, the retaining portion, and the biasing portion are structurally arranged to be coupled together to assemble the sub-assembly portion such that the assembled sub-assembly portion can be coupled with the ferrule portion, and wherein the assembled sub-assembly portion is structurally arranged to be coupled with the ferrule portion after the ferrule portion is pushed through a duct so as to permit field assembly of the MPO connector.

11. The connector of claim 9, wherein the adapter portion includes an adapter front face portion and the ferrule portion includes a ferrule front face portion, and wherein the adapter front face portion and the ferrule front face portion are structurally arranged to collectively define a front face portion of an MPO connector ferrule; and wherein the ferrule portion is structurally arranged to be pushed through a duct having an inside diameter smaller than a lateral dimension of the front face portion of the MPO connector.

12. The connector of claim 9, wherein the biasing portion is structurally arranged to be coupled with the adapter portion and the retaining portion to couple the adapter portion with the retaining portion.

13. The connector of claim 9, wherein the biasing portion comprises two biasing portions disposed parallel to one another on opposite sides of the fibers when coupled with the ferrule portion.

14. The connector of claim 13, wherein each of the biasing portions comprises a compression spring.

15. The connector of claim 9, wherein the retaining portion comprises two body portions that are structurally arranged to be connected to one another by a hinge portion.

16. The connector of claim 15, wherein the retaining portion comprises a single monolithic structure of unitary construction, and the hinge portion comprises a living hinge.

17. The connector of claim 9, wherein the connector further comprises:

a housing portion structurally arranged to be coupled with the retaining member;

a shell portion structurally arranged to be coupled with the housing;

wherein the shell portion is structurally arranged to house a second biasing portion structurally arranged to bear against a forward facing surface of the housing portion and a rearward facing surface of the shell portion to urge the shell portion in the forward direction; and wherein the connector is structurally arranged to be disconnected from a mating adapter by urging the shell portion in a rearward direction against a force of the biasing portion, thereby transferring an urging force to the housing rather than the cable.

18. The connector of claim 9, wherein the ferrule portion is structurally arranged to include first receiving portions at opposing laterals sides of the ferrule portion, wherein the adapter portion is structurally arranged to include second receiving portions that oppose the first receiving portions of the ferrule portion, and wherein the first receiving portions and the second receiving portions are structurally arranged to cooperate to define receiving structures structurally arranged to receive an alignment portion.

19. The connector of claim 18, wherein the receiving structures are structurally arranged to receive alignment members from a mating MPO connector.

20. A sub-assembly for a multi-fiber push on (MPO) connector that is structurally arranged to be field assembled comprising:

a sub-assembly portion including an adapter portion that is structurally arranged to be coupled with a ferrule portion, a retaining portion that is structurally arranged to be coupled with a multi-fiber cable, and a biasing portion that is structurally arranged to extend on opposite sides of fibers of the multi-fiber cable and to couple the adapter portion with the retaining portion;

wherein the biasing portion is structurally arranged to apply separate biasing forces to the adapter portion on opposite sides of the fibers so as to urge the ferrule portion in a forward direction such that the biasing forces are balanced on opposite sides of the fibers; and wherein the sub-assembly portion is structurally arranged to permit field assembly of the MPO connector by providing the adapter portion with an opening structurally arranged to allow fibers that are preterminated with the ferrule portion to be placed between lateral portions of the adapter portion from a direction transverse to the forward direction so as to permit the sub-assembly portion to couple with the ferrule portion after the ferrule portion terminates the fibers.

21. The sub-assembly of claim 20, wherein the adapter portion, the retaining portion, and the biasing portion are structurally arranged to be coupled together to assemble the sub-assembly portion such that the assembled sub-assembly portion can be coupled with the ferrule portion, and wherein the assembled sub-assembly portion is structurally arranged to be coupled with the ferrule portion after the ferrule portion is pushed through a duct so as to permit field assembly of the MPO connector.

22. The sub-assembly of claim 20, wherein the biasing portion is structurally arranged to be coupled with the adapter portion and the retaining portion to couple the adapter portion with the retaining portion.

23. The sub-assembly of claim 20, wherein the biasing portion comprises two biasing portion disposed parallel to one another on opposite sides of the fibers when coupled with the ferrule portion.

24. The sub-assembly of claim 23, wherein each of the biasing portions comprises a compression spring.

25. The sub-assembly of claim 20, wherein the retaining portion comprises two body portions that are structurally arranged to be connected to one another by a hinge portion.

26. The sub-assembly of claim 25, wherein the retaining portion comprises a single monolithic structure of unitary construction, and the hinge portion comprises a living hinge.

27. A multi-fiber push on (MPO) connector that is structurally arranged to be field assembled comprising:

the sub-assembly of claim 20;

a ferrule portion structurally arranged to be coupled with the sub-assembly;

wherein the adapter portion includes an adapter front face portion and the ferrule portion includes a ferrule front face portion, and wherein the adapter front face portion and the ferrule front face portion are structurally arranged to collectively define a front face portion of an MPO connector ferrule; and wherein the ferrule portion is structurally arranged to be pushed through a duct having an inside diameter smaller than a lateral dimension of the front face portion of the MPO connector.

28. The connector of claim 27, wherein the connector further comprises:

a housing portion structurally arranged to be coupled with the retaining member;

a shell portion structurally arranged to be coupled with the housing;

wherein the shell portion is structurally arranged to house a second biasing portion structurally arranged to bear against a forward facing surface of the housing portion and a rearward facing surface of the shell portion to urge the shell portion in the forward direction; and wherein the connector is structurally arranged to be disconnected from a mating adapter by urging the shell portion in a rearward direction against a force of the biasing portion, thereby transferring an urging force to the housing rather than the cable.

29. The connector of claim 27, wherein the ferrule portion is structurally arranged to include first receiving portions at opposing laterals sides of the ferrule portion, wherein the adapter portion is structurally arranged to include second receiving portions that oppose the first receiving portions of the ferrule portion, and wherein the first receiving portions and the second receiving portions are structurally arranged to cooperate to define receiving structures structurally arranged to receive an alignment portion.

30. The connector of claim 29, wherein the receiving structures are structurally arranged to receive alignment members from a mating MPO connector.

* * * * *